(12) United States Patent
Bell

(10) Patent No.: US 9,120,271 B2
(45) Date of Patent: Sep. 1, 2015

(54) RELIABILITY CENTRED MAINTENANCE

(75) Inventor: Matthew Derek Bell, Middleton (GB)

(73) Assignee: BAE SYSTEMS PLC, London (GB)

( * ) Notice: Subject to any disclaimer, the term of this patent is extended or adjusted under 35 U.S.C. 154(b) by 771 days.

(21) Appl. No.: 13/403,314

(22) Filed: Feb. 23, 2012

(65) Prior Publication Data

US 2012/0221125 A1 Aug. 30, 2012

(30) Foreign Application Priority Data

Feb. 24, 2011 (GB) .................................. 1103157.2

(51) Int. Cl.
| | |
|---|---|
| *B29C 70/00* | (2006.01) |
| *B29C 70/10* | (2006.01) |
| *B63B 5/24* | (2006.01) |
| *B63B 9/00* | (2006.01) |
| *G06Q 10/06* | (2012.01) |
| *G06Q 10/00* | (2012.01) |
| *B64D 45/00* | (2006.01) |

(52) U.S. Cl.
CPC . *B29C 70/10* (2013.01); *B63B 5/24* (2013.01); *B63B 9/00* (2013.01); *G06Q 10/06315* (2013.01); *G06Q 10/20* (2013.01); *B64D 2045/0085* (2013.01)

(58) Field of Classification Search
None
See application file for complete search history.

(56) References Cited

U.S. PATENT DOCUMENTS

| | | | |
|---|---|---|---|
| 5,111,402 A | 5/1992 | Brooks et al. | |
| 5,931,877 A | 8/1999 | Smith et al. | |
| 6,901,318 B1 | 5/2005 | Morronigiello et al. | |
| 6,968,293 B2 | 11/2005 | Wiegand | |
| 7,280,925 B1 | 10/2007 | Eker et al. | |
| 7,627,388 B2 | 12/2009 | August et al. | |
| 8,170,893 B1 | 5/2012 | Rossi | |
| 8,452,475 B1 | 5/2013 | West et al. | |
| 8,630,819 B2 | 1/2014 | English et al. | |
| 2003/0004765 A1 | 1/2003 | Wiegand | |
| 2004/0176929 A1 | 9/2004 | Joubert et al. | |

(Continued)

FOREIGN PATENT DOCUMENTS

| | | |
|---|---|---|
| EP | 0 810 558 A | 12/1997 |
| EP | 1 939 801 A1 | 7/2008 |

(Continued)

OTHER PUBLICATIONS

The extended European Search Report dated May 31, 2012, issued in corresponding European Patent Application No. 12156219.3. (8 pages).

(Continued)

*Primary Examiner* — Ryan Jarrett
(74) *Attorney, Agent, or Firm* — Maine Cernota & Rardin

(57) ABSTRACT

A maintenance method and apparatus based on reliability centered maintenance, applied for example to a military aircraft, include the following steps performed in a feedback manner: i) performing RCM; ii) feeding outcomes derived from performing the RCM to an update process; iii) performing the update process to provide update data for performing the RCM; and iv) inputting the update data into the performing of the RCM. The method can carry out a maintenance action selected by and/or or at a time and/or extent specified by the performing of the RCM; the outcomes that are fed to the update process including outcomes from the maintenance action that is carried out. The maintenance method thereby can provide a continuously updating RCM process.

9 Claims, 13 Drawing Sheets

(56) References Cited

U.S. PATENT DOCUMENTS

| | | | |
|---|---|---|---|
| 2005/0187739 | A1 | 8/2005 | Baust et al. |
| 2006/0036344 | A1 | 2/2006 | Liu et al. |
| 2006/0184825 | A1 | 8/2006 | Regan |
| 2007/0112608 | A1* | 5/2007 | Avery et al. ............ 705/8 |
| 2008/0006379 | A1 | 1/2008 | Regan et al. |
| 2008/0133178 | A1 | 6/2008 | Byrne et al. |
| 2008/0147264 | A1 | 6/2008 | Doulatshahi et al. |
| 2008/0154459 | A1 | 6/2008 | Grichnik et al. |
| 2009/0076874 | A1* | 3/2009 | Gross et al. ............ 705/8 |
| 2010/0042283 | A1 | 2/2010 | Kell et al. |
| 2010/0070237 | A1 | 3/2010 | Yitbarek et al. |
| 2011/0040442 | A1 | 2/2011 | Koepping et al. |
| 2011/0066898 | A1 | 3/2011 | Mcrory et al. |
| 2011/0224953 | A1 | 9/2011 | Webster et al. |
| 2014/0052499 | A1* | 2/2014 | Wagner et al. ......... 705/7.36 |

FOREIGN PATENT DOCUMENTS

| | | | |
|---|---|---|---|
| WO | 2007146424 | A2 | 12/2007 |
| WO | 2009/085476 | A1 | 7/2009 |

OTHER PUBLICATIONS

United Kingdom Search Report issued on Jun. 27, 2011 of Application No. GB1103157.2.
United Kingdom Search Report issued on Jun. 24, 2011 of Application No. GB1103151.5.
United Kingdom Search Report issued on Jun. 24, 2011 of Application No. GB1103153.1.
European Search Report issued on Oct. 7, 2011 of Application No. EP 11 27 5037.
Richard Millar, "The Role of Reliability Data Bases in Deploying CBM+, RCM and PHM with TLCSM", Aerospace Conference, Mar. 1, 2008, pp. 1-8.
Alireza Ahmadi et al., "Integration of RCM and PHM for the Next Generation of Aircraft", Aerospace Conference, Mar. 7, 2009, pp. 1-9.
"Guidelins for the Naval Aviation Reliability-Centered Maintenance Process", Navair 00-25-403, Oct. 31, 1996, Management Manual, 105 pages, XP-002660778.
"MILSPEC Reform Final Report an Ending: A New Beginning", Office of the Under Secretary of Defense (Acquisition, Technology & Logistics) Logistics Plans & Programs, Apr. 2001, 20 pages.
Bergman, Walter B. II, "MILSPEC Reform—Results of the First Two Year", PM: Special Issue, Jan.-Feb. 1997, pp. 32-36.
'Operator/Manufacturer Scheduled Maintenance Development—MSG-3', Air Transport Association of America, INC, 84 pages.
'Procedures for Developing Preventive Maintenance—AP100C-22', Royal Air Force, 209 pages.
Wikipedia: "Maintenance, repair, and operations", Internet Article, Feb. 13, 2011, XP055085563, Retrieved from the Internet: URL:http://en.wikipedia.org/w/index.php?title=Maintenance_repair,_and_operations&oldid=413776966 [retrieved on Oct. 28, 2013], 4 pages.
Wikipedia: "Reliability centered maintenance", Internet Article, Feb. 2, 2011, XP055085566, Retrieved from the Internet: URL:http://en.wikipedia.org/w/index.php?title=Reliability_centered_maintenance&oldid=411557933 [retrieved on Oct. 28, 2013], 5 pages.
Office Action issued by the U.S. Patent and Trademark Office in the U.S. Appl. No. 13/403,347, mailed May 10, 2013, U.S. Patent and Trademark Office, Alexandria, VA. (15 pages).

* cited by examiner

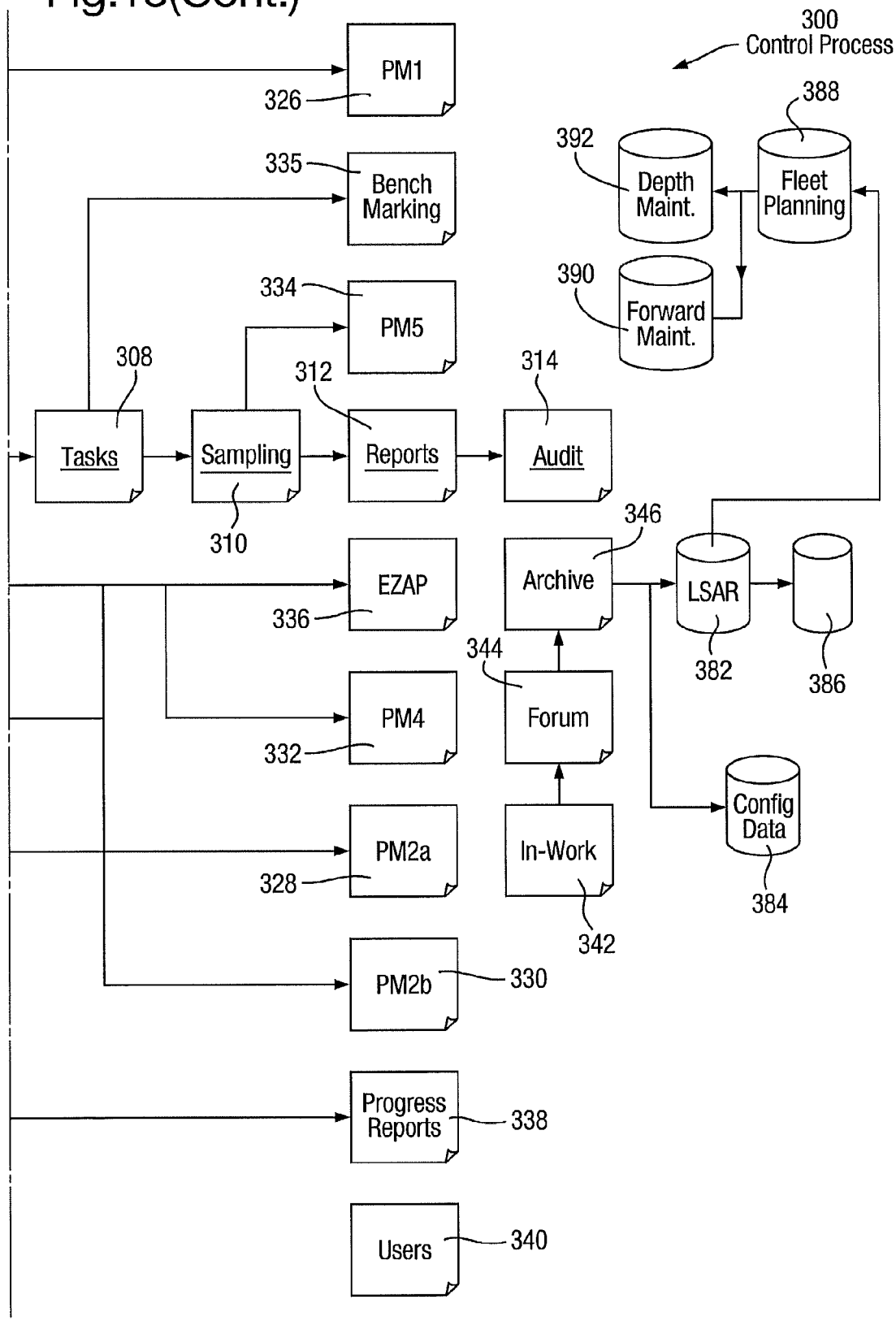

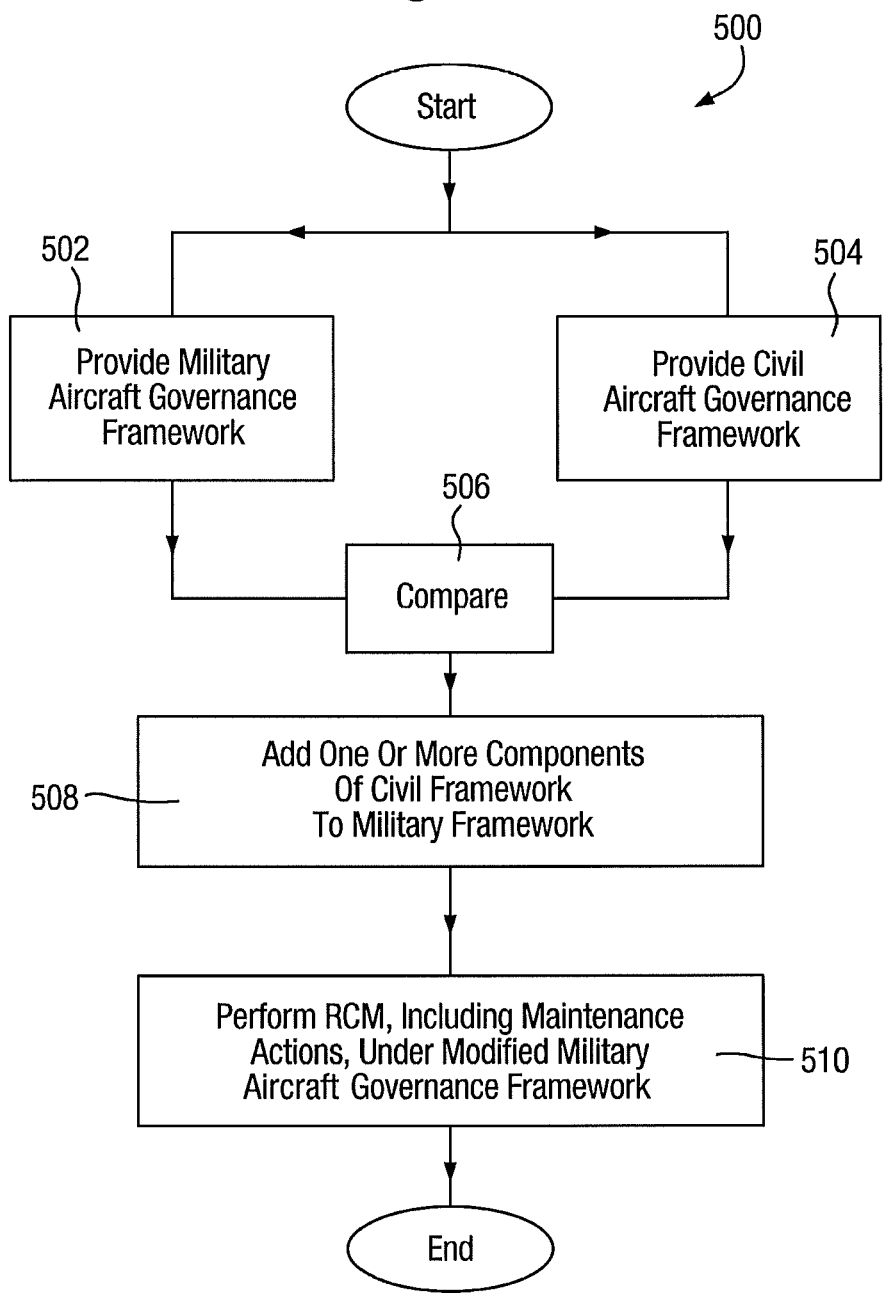

RELIABILITY CENTRED MAINTENANCE

FIELD OF THE INVENTION

The present invention relates to reliability centred maintenance (RCM), and is particularly applicable to, but not limited to, the use of RCM for military aircraft.

BACKGROUND

Maintenance regimes for systems and equipment can be scheduled and carried out in many conventional ways, for example specific selected maintenance actions such as replacing or testing a component of a vehicle can be carried out at fixed time intervals or fixed operational time intervals.

For complex and/or safety-critical systems, for example passenger aircraft and military aircraft, it is known to use a systematic, "holistic" maintenance approach known as reliability centred maintenance (RCM). Although in one sense any maintenance can be considered as improving reliability, it will be appreciated by the person skilled in the art of maintenance of complex and/or safety-critical systems that the terminology "reliability centred maintenance" defines specific types of recognised large scale preventive maintenance processes. Examples of recognised RCM processes are "Operator/Manufacturer Scheduled Maintenance Development—MSG-3" (published by the Air Transport Association of America, Inc. (ATA)) and "Procedures for Developing Preventive Maintenance—AP100C-22" (published by the Royal Air Force (RAF) and available from the Defence Storage and Distribution Centre (DSDC), LLangennech, UK). Conventionally, a bespoke RCM program or plan is produced for a specific aircraft type/scenario combination, where the scenario may be, for example, one or more of intended deployment mode, specification of variable parameters/components of the aircraft, customer identity, and so on. Preventive maintenance actions, such as replacing or testing a component of the aircraft, are then selected according to the RCM output and carried out at times and/or to extents determined by the output of the RCM program.

It is known to provide software that implements or controls some or all of the RCM. This software, or other forms of implementation, and its operation, may be known as an RCM toolset.

Parts of the RCM process are carried out and/or managed by human operators. Control of the operation of the human operator in their efforts to implement processes as part of RCM may be known as governance. In respective application areas, e.g. one being for civil aircraft, a different one being for military aircraft, corresponding respective governance arrangements are either specified as part of RCM or have become common practice when implementing RCM in that particular respective application area. Hence, for example, conventionally governance for RCM for military aircraft is considered to be completely different to, and incompatible with, governance for RCM for civil aircraft, and also completely different to, and incompatible with, governance for other industries such as the oil industry, nuclear industry, and so on.

SUMMARY OF THE INVENTION

In a first aspect, the present invention provides a maintenance method based on reliability centred maintenance (RCM); the maintenance method comprising the following steps performed in a feedback manner: i) performing RCM; ii) feeding outcomes derived from performing the RCM to an update process; iii) performing the update process to provide update data for performing the RCM; and iv) inputting the update data into the performing of the RCM.

The method may further comprise carrying out a maintenance action selected by the performing of the RCM; and wherein the outcomes derived from performing the RCM that are fed to the update process comprise outcomes from the maintenance action that is carried out.

The method may further comprise carrying out a maintenance action performed at a time specified by the performing of the RCM; and wherein the outcomes derived from performing the RCM that are fed to the update process comprise outcomes from the maintenance action that is carried out.

The method may further comprise carrying out a maintenance action performed to an extent specified by the performing of the RCM; and wherein the outcomes derived from performing the RCM that are fed to the update process comprise outcomes from the maintenance action that is carried out.

The update process may comprise one or more of the following processes: a baseline review process; a continuous review process; and an RCM study process.

The update process may comprise a trigger mechanism process.

The outcomes from performing the RCM may be fed to the update process via an identify preventive maintenance requirements process.

The outcomes from performing the RCM may be fed to the update process via a maintenance repair organisation process.

The performed maintenance action may be performed as part of the maintenance repair organisation process.

The outcomes from performing the RCM may be fed to the update process via a maintenance approved organisation process.

The maintenance method may thereby provide a continuously updating RCM process.

The maintenance method may be applied to a military aircraft.

In a further aspect, the present invention provides apparatus for performing a maintenance method based on reliability centred maintenance (RCM); the apparatus comprising one or more processors arranged to perform the following steps in a feedback manner: i) performing RCM; ii) feeding outcomes derived from performing the RCM to an update process; iii) performing the update process to provide update data for performing the RCM; and iv) inputting the update data into the performing of the RCM.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above mentioned aspect.

BRIEF DESCRIPTION OF THE DRAWINGS

FIG. 14 is a process flowchart showing certain steps of an RCM governance and maintenance actions process.

DETAILED DESCRIPTION

Figure 1:
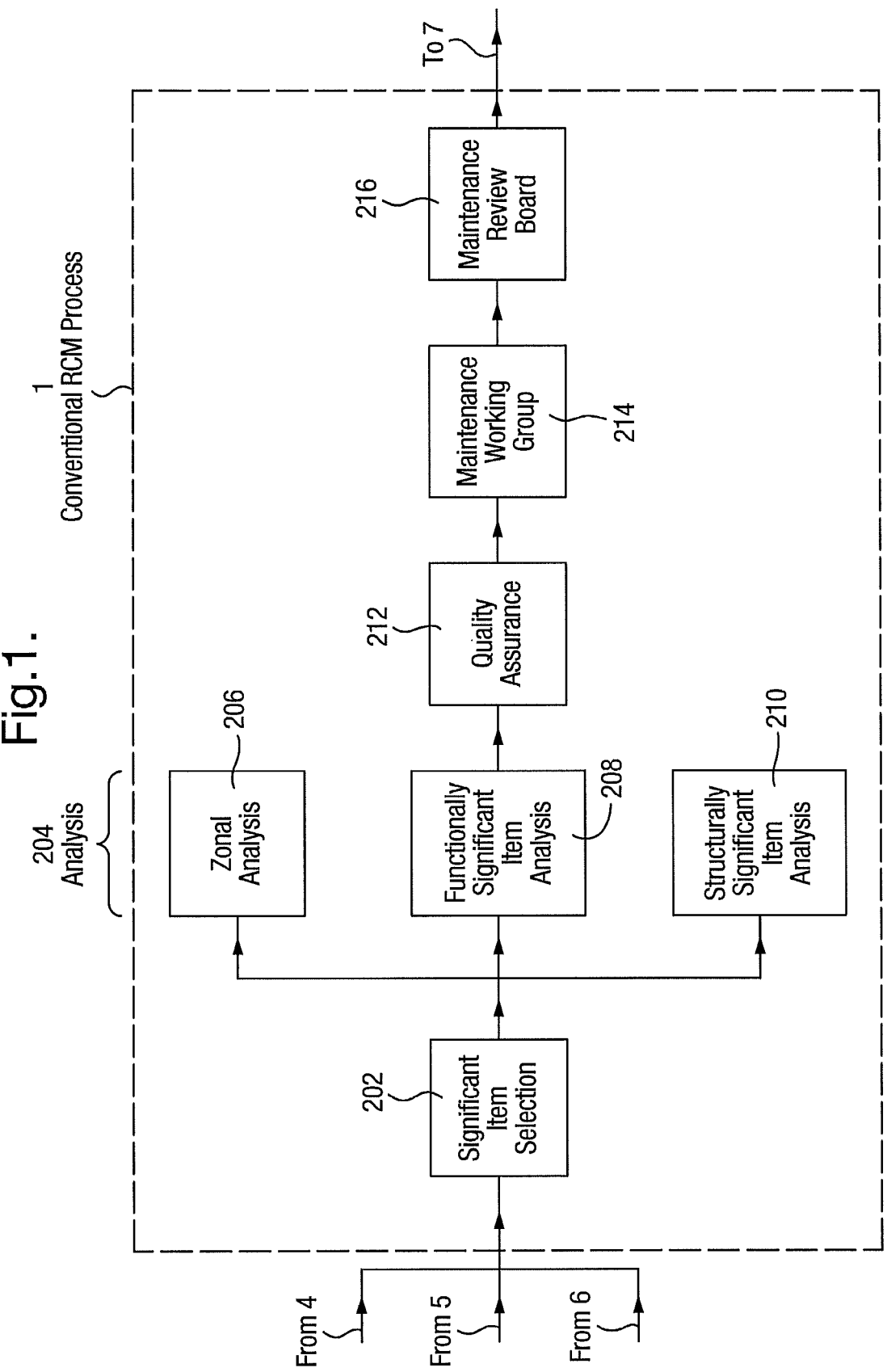
FIG. 1 is a flowchart/block diagram of a conventional RCM process for a military aircraft.

FIG. 1 is a flowchart/block diagram of a conventional RCM process 1 for a military aircraft. In this example the conventional RCM process 1 is one implemented for a military aircraft, and in which the implementation is at least substantially or approximately in line with the RCM standard "AP100C-22" referenced above.

Each block in FIG. 1 (and the following Figures) may be considered as representing a process step in a flowchart, or equally as a functional module of a system for implementing a process. It will be appreciated by the person skilled in the art of RCM that RCM is a highly complex process, and the full detailed specification of any specific RCM program would in practice usually require many thousands of pages or data sets, and accordingly the representations in FIG. 1 and all following Figures, and their associated descriptions, are by necessity in a simplified form. The person skilled in the art of RCM will be aware of this and will accordingly be able to implement highly complex systems/processes/programs based on these simplified descriptions, as this by necessity is a skill routinely employed in this field.

The conventional RCM process 1 comprises various processes that may conveniently be called as follows: a significant item selection process 202, an analysis process 204, a quality assurance process 212, a maintenance working group process 214, and a maintenance review board process 216.

(N.B. Also shown in FIG. 1 are inputs into the significant item selection process 202, from a "process 4", from a "process 5", and from a "process 6". These are relevant to how the conventional RCM process 1 is incorporated in a continuous RCM process 20, as will be described in more detail later below, and in which the "process 4" indicates a baseline review process 4, the "process 5" indicates a continuous review process 5, and the "process 6" indicates an RCM study process 6, as will be described in more detail later below. In other words, the receipt of inputs from a baseline review process 4, a continuous review process 5, and an RCM study process 6 is not as such part of conventional stand-alone RCM processes, but is nevertheless shown in FIG. 1 for consistency with the later description of how a conventional RCM process is used in the continuous RCM process that will be described later below.)

Outcomes of the significant item selection process 202 are input in to the analysis process 204, which in more detail comprises three types of analysis process, namely zonal analysis process 206, functionally significant item analysis process 208, and structurally significant item analysis process 210.

Outcomes of the analysis process 204 are input in to the quality assurance process 212.

Outcomes of the quality assurance process 212 are input in to the maintenance working group process 214.

Outcomes of the maintenance working group process 214 are input in to the maintenance review board process 216.

Accordingly, and in a manner well known to the skilled person, an outcome of the maintenance review board process 216 is an RCM program that specifies selected maintenance actions and schedules for those actions. Thus, as a result of the conventional RCM process 1, maintenance actions, for example replacing or testing a component of the aircraft are selected, scheduled and later carried out according to the schedule.

(N.B. Also shown in FIG. 1 is an output from the maintenance review board process 216 to a "process 7". This is relevant to how the conventional RCM process 1 is incorporated in a continuous RCM process 20, as will be described in more detail later below, and in which the "process 7" indicates an identify preventive maintenance requirements process 7, as will be described in more detail later below. In other words, the outputting to an identify preventive maintenance requirements process 7 is not as such part of conventional stand-alone RCM processes, but is nevertheless shown in FIG. 1 for consistency with the later description of how a conventional RCM process is used in the continuous RCM process that will be described later below.)

Figure 2:
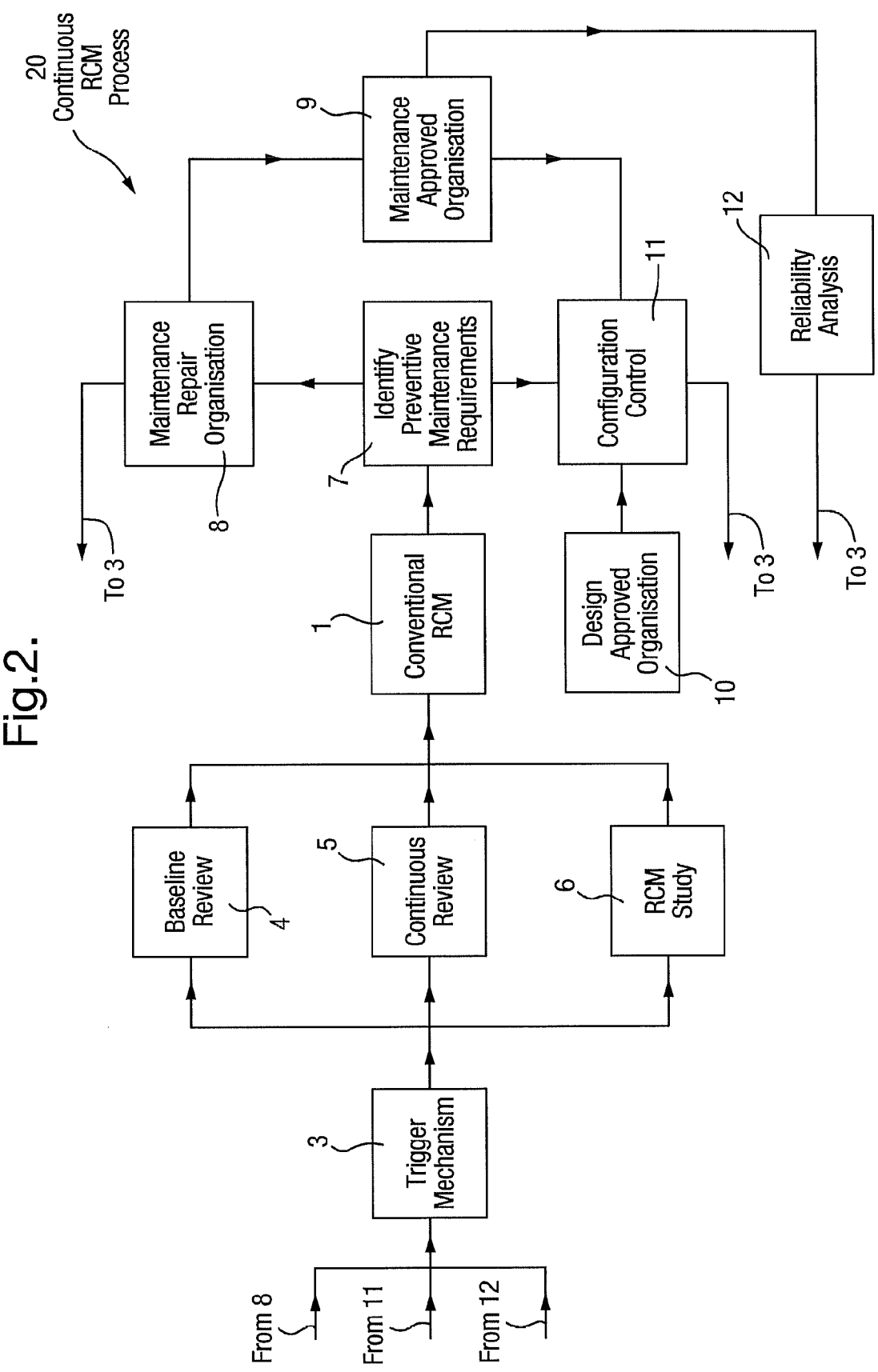
FIG. 2 is a flowchart/block diagram of an overview of a continuous RCM process for military aircraft.

FIG. 2 is a flowchart/block diagram of an overview of an embodiment of a modified RCM process 20, hereinafter referred to as a continuous RCM process 20, for military aircraft. As will be explained in more detail below, as part of the continuous RCM process 20, the conventional RCM process 1 described above with reference to FIG. 1 is carried out in a repeated manner along with many new additional processes and steps that broadly speaking either use outputs of the conventional RCM process 1 or produce updated inputs for the conventional RCM process 1, in the manner of one or more feedback loops.

Each repeated loop of the continuous RCM process 20 is triggered by a process that may conveniently be called a trigger mechanism process 3 (which will be described in more detail later below with reference to FIG. 3).

Outcomes of the trigger mechanism process 3 are input into one or more reviews and/or studies that are then performed, in this example ones which may conveniently be called a baseline review process 4, a continuous review process 5, and an RCM study process 6 (which will be described in more detail later below with reference to FIGS. 4 to 6 respectively).

Outcomes of the reviews and/or studies are input into the conventional RCM process 1.

The conventional RCM process is as described earlier above with reference to FIG. 1. It will be appreciated by the skilled person in the art that this will include any minor modifications, internal repetitions, changes in data flow direction and so on that may be required or may be found desirable in any given implementation, as a consequence of the way in which the conventional process 1 is incorporated within this continuous RCM process 20. Any such modifications etc. will be readily implementable by the person skilled in the art of RCM, especially since in all practical implementations of conventional RCM such modifications and the like are frequently required to be made to adapt to each particular RCM scenario.

Outcomes of the conventional RCM process 1 are input into a process that may conveniently be called an "identify preventive maintenance requirements" process 7 (which will be described in more detail later below with reference to FIG. 7).

Outcomes of the identify preventive maintenance requirements process 7 are input into two processes, one being a process that may conveniently be called a maintenance repair organisation process 8 (which will be described in more detail later below with reference to FIG. 8), and the other being a process that may conveniently be called a configuration control process 11 (which will be described in more detail later below with reference to FIG. 11).

It is noted that as part of the maintenance repair organisation process 8, maintenance actions, for example replacing or testing a component of the aircraft, are selected, scheduled and later carried out according to the schedule.

Outcomes of the maintenance repair organisation process 8 are returned, to provide a form of continuous feedback implementation, to the trigger mechanism process 3. These outcomes will at least in part be used by the trigger mechanism process 3 in triggering the next loop of the continuous RCM process 20. Outcomes of the maintenance repair organisation process 8 are also input into a process that may conveniently be called a maintenance approved organisation process 9 (which will be described in more detail later below with reference to FIG. 9).

Outcomes of the maintenance approved organisation process 9 are input into the configuration control process 11. Outcomes of the maintenance approved organisation process 9 are also input into a process that may conveniently be called a reliability analysis process 12 (which will be described in more detail later below with reference to FIG. 12).

Outcomes of the reliability analysis process 12 are returned, to provide a form of continuous feedback implementation, to the trigger mechanism process 3. These outcomes will at least in part be used by the trigger mechanism process 3 in triggering the next loop of the continuous RCM process 20.

Another process that provides outcomes that are input into the configuration control process 9 is a process that may conveniently be called a design approved organisation process 10 (which will be described in more detail later below with reference to FIG. 10).

Outcomes of the configuration control process 11 are returned, to provide a form of continuous feedback implementation, to the trigger mechanism process 3. These outcomes will at least in part be used by the trigger mechanism process 3 in triggering the next loop of the continuous RCM process 20.

Figure 3:
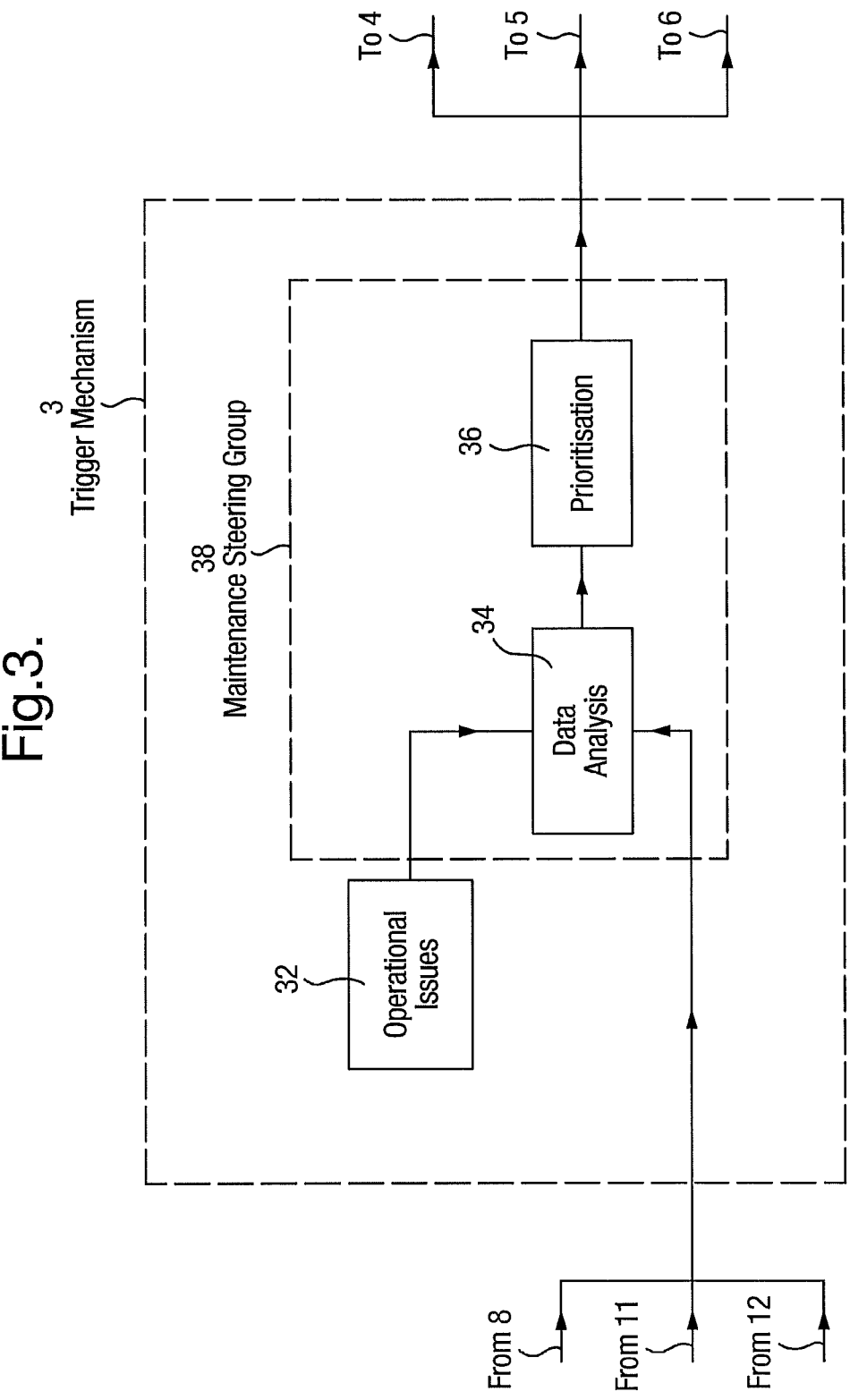
FIG. 3 is a flowchart/block diagram showing certain details of a trigger mechanism process that is part of the continuous RCM process of FIG. 2.

FIG. 3 is a flowchart/block diagram showing certain details of the trigger mechanism process 3. The trigger mechanism process 3 triggers each repeated loop of the continuous RCM process 20. The trigger mechanism process 3 comprises various processes that may conveniently be called as follows: an operational issues process 32, a data analysis process 34 and a prioritisation process 36. The data analysis process 34 and the prioritisation process 36 in combination provide a maintenance steering group process 38.

The operational issues process 32 provides feedback from the operator of the aircraft (e.g. an air force) for faults that have been identified from the use of the aircraft. This may include system feedback reports, operator/discussions with the pilots, operational context information and diagnostic data pertaining to the sortie of the aircraft.

Outcomes of the operational issues process 32 are input into the data analysis process 34. The outcomes from each of the maintenance repair organisation process 8, the configuration control process 9, and the reliability analysis process 12 are also input into the data analysis process 34, providing a feedback loop operation.

The data analysis process 34 provides analysis of the operational, design and maintenance data. The data analysis process identifies and codifies the key elements of information and provides a logical and hierarchical reporting mechanism of key issues impacting, for example, aircraft safety, operation and cost.

Outcomes of the data analysis process 34 are input into the prioritisation process 36.

The prioritisation process 36 comprises invoking of action to address the data analysis results from the data analysis process 34. The prioritisation process 36 directs a course of sequenced action and resources to investigate the aircraft operating effects defined in the data analysis process 34.

Thus the maintenance steering group process 38, which comprises the data analysis process 34 and the prioritisation process 36, in effect defines the maintenance strategy for the aircraft platform on a continual improvement basis using actuarial operational and maintenance data. This may include the whole aircraft fleet and individual squadrons.

Outcomes of the prioritisation process 36 (i.e. outcomes of the maintenance steering group process 38) are output from the trigger mechanism process 3 for inputting to the baseline review process 4, the continuous review process 5, and the RCM study process 6. These outcomes are in effect directives to conduct a directed and precise method of RCM analysis, which is dependant on the actuarial data and operational context.

Figure 4:
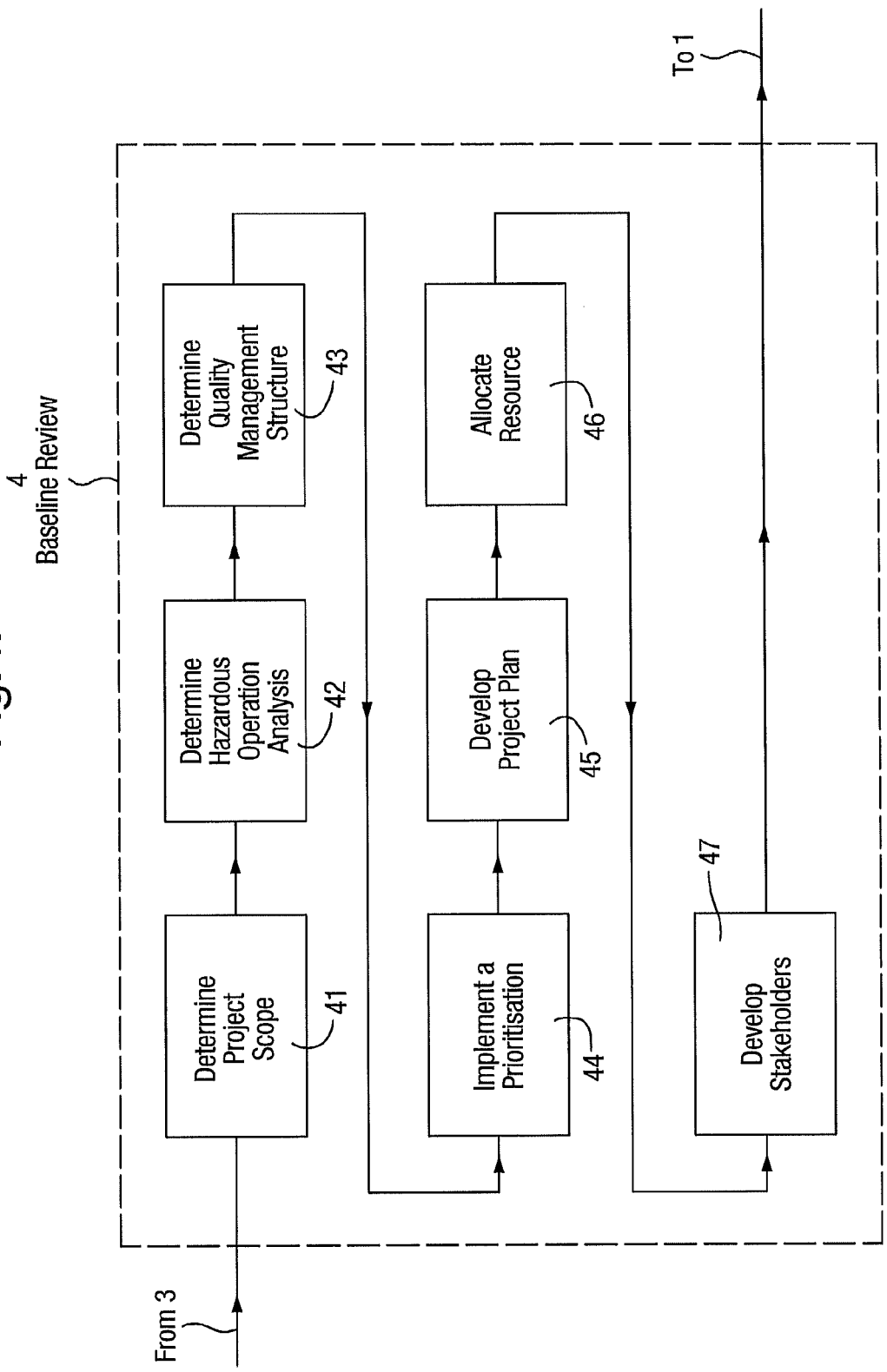
FIG. 4 is a flowchart/block diagram showing certain details of a baseline review process that is part of the continuous RCM process of FIG. 2.

FIG. 4 is a flowchart/block diagram showing certain details of the baseline review process 4. The baseline review process 4 comprises various processes that may conveniently be called as follows: a determine project scope process 41, a determine hazardous operation analysis process 42, a determine quality management structure process 43, an implement a prioritisation process 44, a develop project plan process 45, an allocate resource process 46, and a develop stakeholders process 47.

The following stages of the baseline review process 4 are performed on prioritisation data and data analysis data that constitute "baseline data" and has primarily originated from the operational issues process 32 of the trigger mechanism process 3.

The determine project scope process 41 defines the scope, requirements, method and quality plan for the RCM project. The project scope is explicit in defining the operational and organisation context in how the RCM project is being carried out.

Outcomes of the determine project scope process 41 are input into the determine hazardous operation analysis process 42.

The determine hazardous operation analysis process 42 comprises performing risk analysis and risk mitigation analysis. The process also comprises analysis of how the RCM process might fail, and how that would affect the safety of the aircraft.

Outcomes of the determine hazardous operation analysis process 42 are input into the determine quality management structure process 43.

The determine quality management structure process 43 comprises determining training procedures and determining toolsets. Further details of aspects of the determination and control of training procedures is given later below in a description of governance issues. Further details and examples of toolsets are also described later below.

Outcomes of the determine quality management structure process 43 are input into the implement a prioritisation process 44.

The implement a prioritisation process 44 comprises prioritising, and determining details of, the program objectives. This comprises, for example, a list of aircraft parts and respective lists of maintenance actions that are to be taken with regard to each of those parts.

Outcomes of the implement a prioritisation process 44 are input into the develop project plan process 45.

The develop project plan process 45 comprises determining what has to be done to facilitate and perform those maintenance actions, and what timescales are relevant to them. In other words, this comprises determining "what has to be done?". Outcomes of the develop project plan process 45 are input into the allocate resource process 46.

The allocate resource process 46 comprises allocating resources for the activities determined in the preceding process. In other words, this comprises determining "how are the things that have to be done going to be achieved?".

Outcomes of the allocate resource process 46 are input into the develop stakeholders process 47.

The develop stakeholders process 47 comprises determining which people or organisations will be responsible for which of the activities that have been determined in the preceding steps. This may include training or relevant people. Such training may be implemented according to the methods and under the constraints of aspects given later below in a description of governance issues.

Outcomes of the develop stakeholders process 47 are output from the baseline review process 4 for inputting to the conventional RCM process 1. These outcomes comprise, in effect, components of a quality plan for performing conventional RCM.

Figure 5:
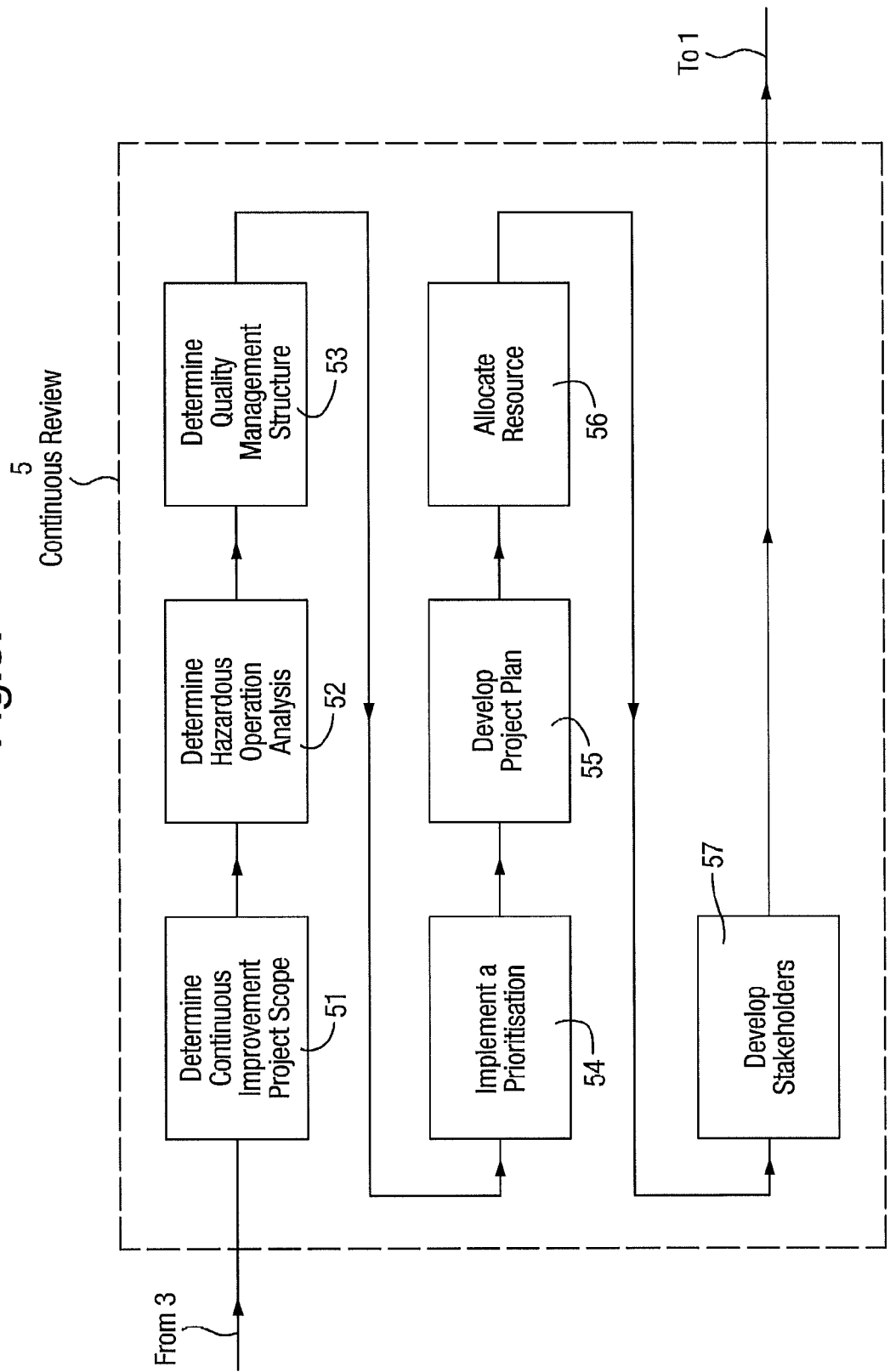
FIG. 5 is a flowchart/block diagram showing certain details of a continuous review process that is part of the continuous RCM process of FIG. 2.

FIG. 5 is a flowchart/block diagram showing certain details of the continuous review process 5. The continuous review process 5 comprises various processes that may conveniently be called as follows: a determine continuous improvement project scope process 51, a determine hazardous operation analysis process 52, a determine quality management structure process 53, an implement a prioritisation process 54, a develop project plan process 55, an allocate resource process 56, and a develop stakeholders process 57.

The following stages of the continuous review process 5 are performed on prioritisation data and data analysis data derived from data that has been fed back to the data analysis process 34 from the maintenance repair organisation process 8, the configuration control process 9, and the reliability analysis process 12.

The determine continuous improvement project scope project process 51 defines the specific and detailed requirements for the continuous improvement RCM project. This may include a scope of safety analysis, operational context exclusions and a resource plan to satisfy a proactive RCM review.

Outcomes of the determine continuous improvement project scope process 51 are input into the determine hazardous operation analysis process 52.

The determine hazardous operation analysis process 52 comprises performing risk analysis and risk mitigation analysis. The process also comprises analysis of how the RCM process might fail, and how that would affect the safety of the aircraft.

Outcomes of the determine hazardous operation analysis process 52 are input into the determine quality management structure process 53.

The determine quality management structure process 53 comprises determining training procedures and determining toolsets. Further details of aspects of the determination and control of training procedures are given later below in a description of governance issues. Further details and examples of toolsets are also described later below.

Outcomes of the determine quality management structure process 53 are input into the implement a prioritisation process 54.

The implement a prioritisation process 54 comprises prioritising, and determining details of, the program objectives. This comprises, for example, a list of aircraft parts and respective lists of maintenance actions that are to be taken with regard to each of those parts.

Outcomes of the implement a prioritisation process 54 are input into the develop project plan process 55.

The develop project plan process 55 comprises determining what has to be done to facilitate and perform those maintenance actions, and what timescales are relevant to them. In other words, this comprises determining "what has to be done?". Outcomes of the develop project plan process 55 are input into the allocate resource process 56.

The allocate resource process 56 comprises allocating resources for the activities determined in the preceding process. In other words, this comprises determining "how are the things that have to be done going to be achieved?".

Outcomes of the allocate resource process 56 are input into the develop stakeholders process 57.

The develop stakeholders process 57 comprises determining which people or organisations will be responsible for which of the activities that have been determined in the preceding steps. This may include training or relevant people. Such training may be implemented according to the methods and under the constraints of aspects given later below in a description of governance issues.

Outcomes of the develop stakeholders process 57 are output from the continuous review process 5 for inputting to the conventional RCM process 1. These outcomes comprise, in effect, components of a quality plan for performing conventional RCM.

Figure 6:
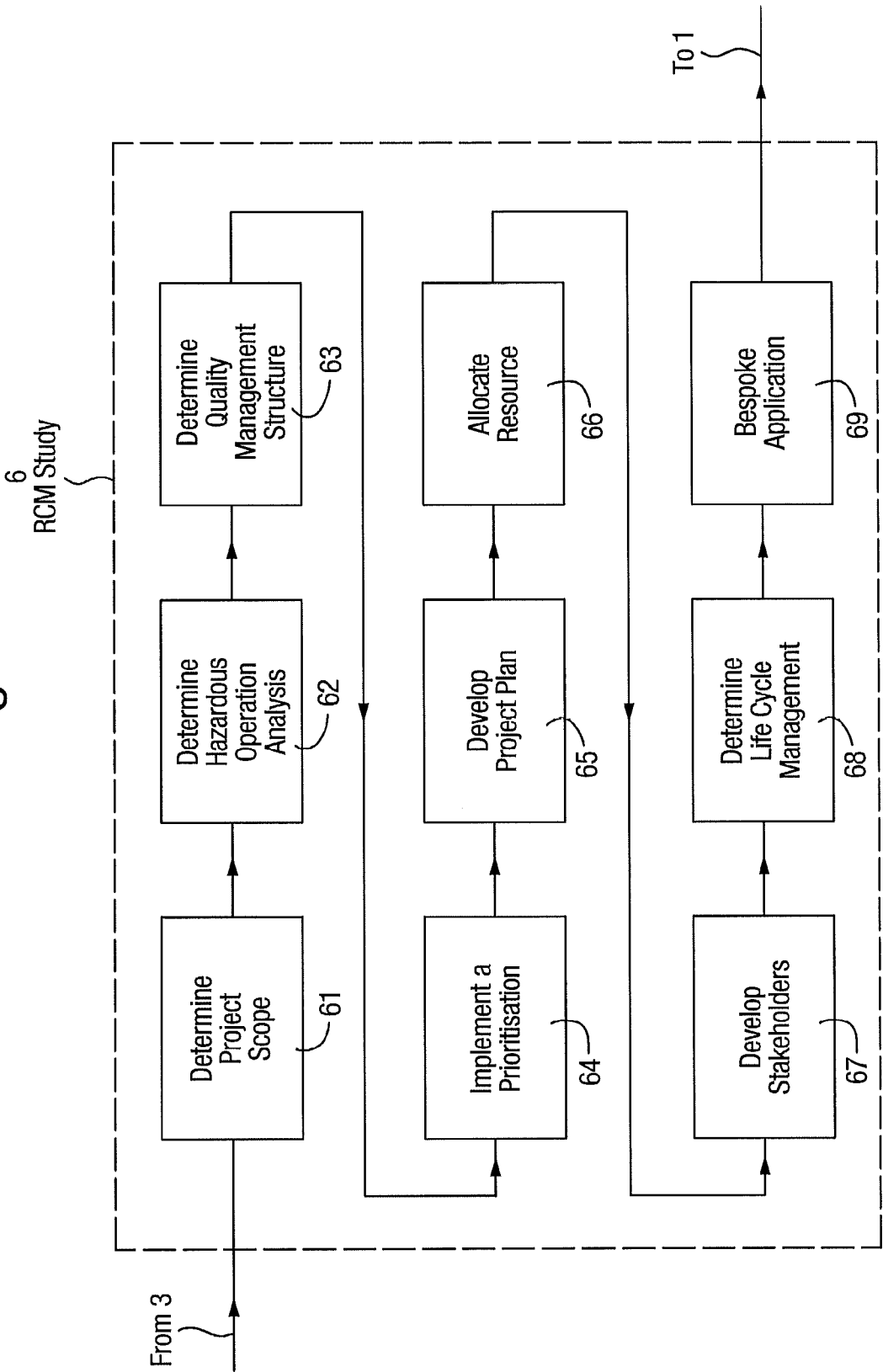
FIG. 6 is a flowchart/block diagram showing certain details of an RCM study process that is part of the continuous RCM process of FIG. 2.

FIG. 6 is a flowchart/block diagram showing certain details of the RCM study process 6. The RCM study process 6 comprises various processes that may conveniently be called as follows: a determine project scope process 61, a determine hazardous operation analysis process 62, a determine quality management structure process 63, an implement a prioritisation process 64, a develop project plan process 65, an allocate resource process 66, a develop stakeholders process 67, a determine life cycle management process 68, and a bespoke application process 69.

The following stages of the RCM study process 6 are performed on both (i) prioritisation data and data analysis data that constitutes "baseline data" and has primarily originated from the operational issues process 32 of the trigger mechanism process 3, and (ii) prioritisation data and data analysis data derived from data that has been fed back to the data analysis process 34 from the maintenance repair organisation process 8, the configuration control process 9, and the reliability analysis process 12.

The determine project scope process 61 is specific to define the requirements on new RCM contract deliverables. This may result in new commercial arrangements and contracts being developed. The project scope for a specific RCM study may be directed to address urgent operational requirements or a change of role/operational context. For example a military aircraft operating within a hostile environment as opposed to the home country. This may have a substantial impact of the requirements of the preventive maintenance requirements.

Outcomes of the determine project scope process 61 are input into the determine hazardous operation analysis process 62.

The determine hazardous operation analysis process 62 comprises performing risk analysis and risk mitigation analysis. The process also comprises analysis of how the RCM process might fail, and how that would affect the safety of the aircraft.

Outcomes of the determine hazardous operation analysis process 62 are input into the determine quality management structure process 63.

The determine quality management structure process 63 comprises determining training procedures and determining toolsets. Further details of aspects of the determination and control of training procedures is given later below in a description of governance issues. Further details and examples of toolsets are also described later below.

Outcomes of the determine quality management structure process 63 are input into the implement a prioritisation process 64.

The implement a prioritisation process 64 comprises prioritising, and determining details of, the program objectives. This comprises, for example, a list of aircraft parts and respective lists of maintenance actions that are to be taken with regard to each of those parts.

Outcomes of the implement a prioritisation process 64 are input into the develop project plan process 65.

The develop project plan process 65 comprises determining what has to be done to facilitate and perform those maintenance actions, and what timescales are relevant to them. In other words, this comprises determining "what has to be done?". Outcomes of the develop project plan process 65 are input into the allocate resource process 66.

The allocate resource process 66 comprises allocating resources for the activities determined in the preceding process. In other words, this comprises determining "how are the things that have to be done going to be achieved?".

Outcomes of the allocate resource process 66 are input into the develop stakeholders process 67.

The develop stakeholders process 67 comprises determining which people or organisations will be responsible for which of the activities that have been determined in the preceding steps. This may include training or relevant people. Such training may be implemented according to the methods and under the constraints of aspects given later below in a description of governance issues.

Outcomes of the develop stakeholders process 67 are input into the determine life cycle management process 68.

The determine life cycle management process 68 may provide, for example, control of the RCM project using a dedicated Project Management representative to ensure the project is delivered on time, to contract and at the correct cost. The life cycle management process is an external quality control process that ensures the RCM study is managed from concept through to delivery and closure.

Outcomes of the determine life cycle management process 68 are input into the bespoke application process 69. This process uses any new specific information, including information derived from data that has been fed back to the data analysis process 34 from the reliability analysis process 12, in response to a request for information (RFI) or e.g. in relation to a bespoke application. This will in practice usually occur in tandem with contractual processes such as a standard activity known as "launch contract".

Outcomes of the bespoke application process 69 are output from the RCM study process 6 for inputting to the conventional RCM process 1. These outcomes comprise, in effect, components of a quality plan for performing conventional RCM.

Figure 7:
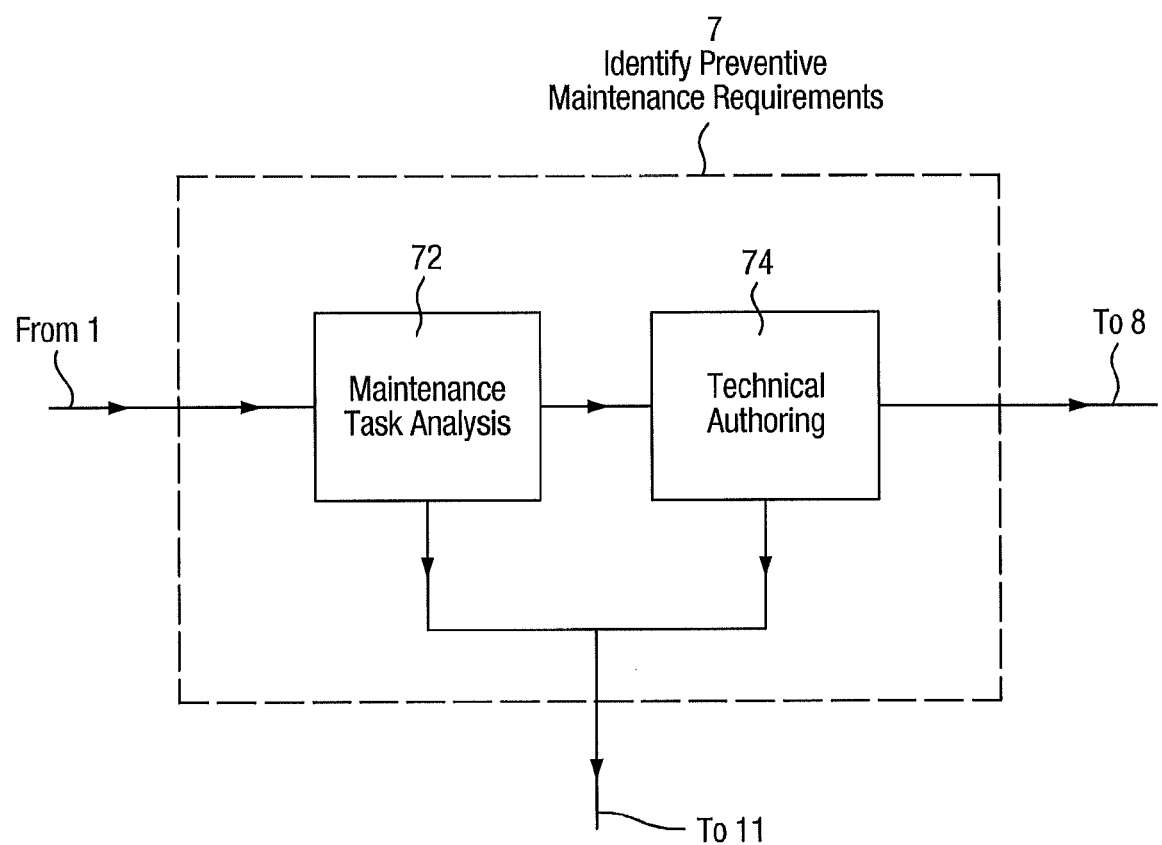
FIG. 7 is a flowchart/block diagram showing certain details of an identify preventive maintenance requirements process that is part of the continuous RCM process of FIG. 2.

FIG. 7 is a flowchart/block diagram showing certain details of the identify preventive maintenance requirements process 7. The identify preventive maintenance requirements process 7 comprises various processes that may conveniently be called as follows: a maintenance task analysis process 72 and a technical authoring process 74.

The maintenance task analysis process 72 receives outcomes from the conventional RCM process 1. The outcomes may include, for example, an RCM program that specifies selected maintenance actions and schedules for those actions, i.e. what may be termed "what is going to be done". The maintenance task analysis process 72 determines how the specified actions and schedules are going to be achieved, i.e. what may be termed "how it is going to be done".

Outcomes of the maintenance task analysis process 72 are input to the technical authoring process 74.

The technical authoring process 74 is used to produce data/items such as maintenance manuals, schedule lists and so on.

Outcomes of the technical authoring process 74 are output from the identify preventive maintenance requirements process 7 for inputting to the maintenance repair organisation process 8.

Additionally, outcomes of both the maintenance task analysis process 72 and the technical authoring process 74 are output from the identify preventive maintenance requirements process 7 for inputting to the configuration control process 11.

Figure 8:
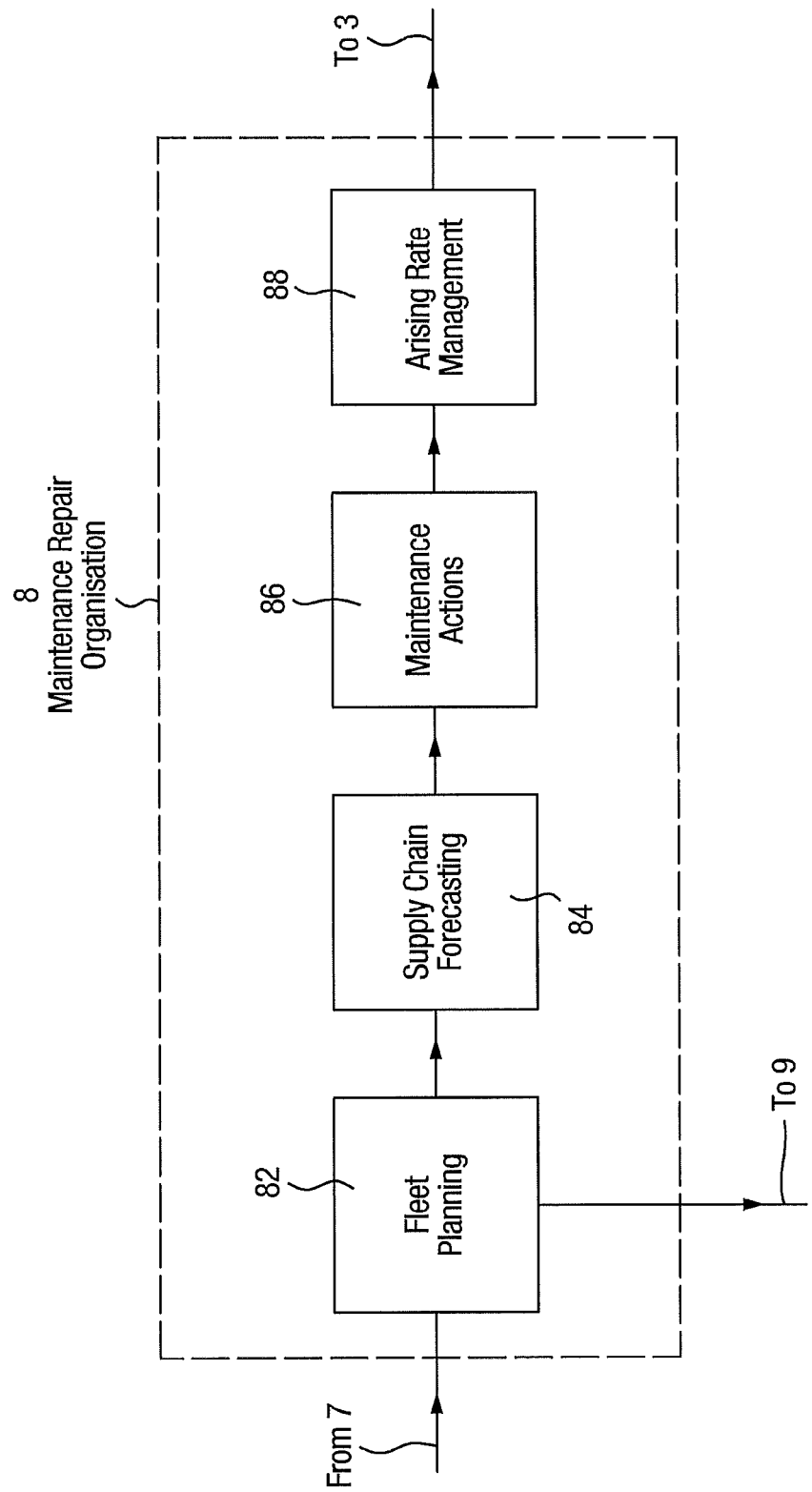
FIG. 8 is a flowchart/block diagram showing certain details of a maintenance repair organisation process that is part of the continuous RCM process of FIG. 2.

FIG. 8 is a flowchart/block diagram showing certain details of the maintenance repair organisation process 8. The maintenance repair organisation process 8 comprises various processes that may conveniently be called as follows: a fleet planning process 82, a supply chain forecasting process 84, a maintenance process 86, and an arising rate management process 88.

The fleet planning process 82 receives outcomes from the identify preventive maintenance requirements process 7, more particularly from the technical authoring process 74. The outcomes may include, for example, data/items such as maintenance manuals, schedule lists and so on.

The fleet planning process 82 plans resources, facilities, spare parts, etc. For example, the received outcomes are combined with and compared to variables such as how many aircraft are in a batch, how many service facilities, such as service bays, are available at the schedule timings, and so on.

Outcomes from the fleet planning process 82 are input to the supply chain forecasting process 84. Outcomes from the fleet planning process 82 are also output from the maintenance repair organisation process 8 for inputting to the maintenance approved organisation process 9.

The supply chain forecasting process 84 proactively determines demand forecasts, and supply/vendor management etc.

Outcomes from the supply chain forecasting process 84 are input into the maintenance process 86, i.e. provide final specification of the maintenance actions to be performed on the aircraft.

The maintenance process 86 comprises carrying out the specified maintenance actions, for example maintenance actions such as replacing or testing a component of one or more aircraft.

Information and data obtained during the maintenance actions, for example confirmation that actions have been performed, test measurements and results, unexpected outcomes, and the like, are recorded and reported as part of the maintenance process 86, and output from the maintenance process 86 and input into the arising rate management process 88.

The arising rate management process 88 analyses the data and information received from the maintenance process 86 to determine and/or estimate aspects such as failure rates of components on the aircraft, how many failures are occurring earlier than expected or at greater than expected levels of occurrence, what trends can be determined, do any results represent scenarios that might be used as trigger mechanisms for analysing/preventing further failures, and so on.

Outcomes of the arising rate management process 88 are output from the maintenance repair organisation process 8 for feeding back to the trigger mechanism process 3, more particularly back to the data analysis process 34 of the trigger mechanism process 3.

Figure 9:
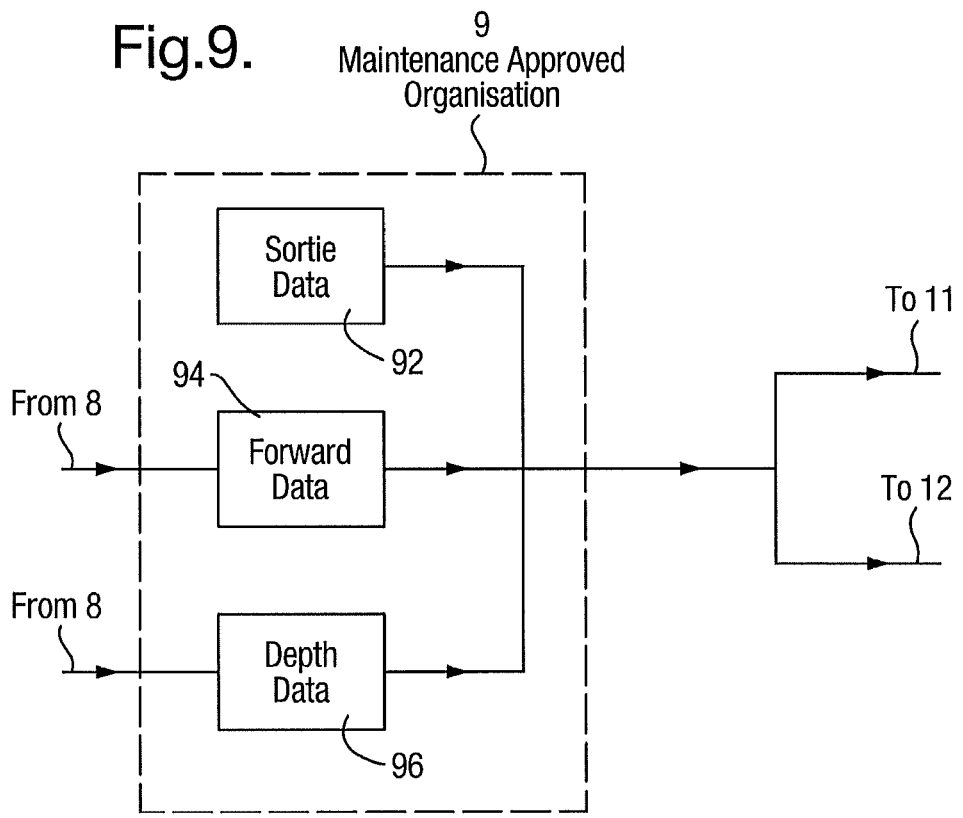
FIG. 9 is a flowchart/block diagram showing certain details of a maintenance approved organisation process.

FIG. 9 is a flowchart/block diagram showing certain details of the maintenance approved organisation process 9. The maintenance approved organisation process 9 comprises various processes that may conveniently be called as follows: a sortie data process 92, a forward data process 94, and a depth data process 96. These all use/provide examples of use of operational and maintenance feedback data.

The sortie data process 92 provides data obtained from flights by the aircraft. The data may include quantitative telemetry data and/or feedback from pilots and/or ground crew and/or flight operators.

The forward data process 94 receives outcomes from the maintenance repair organisation process 8, more particularly from the fleet planning process 82.

The forward data process 94 provides forward maintenance data, e.g. data obtained from maintenance carried out at flight servicing or on the aircraft while in a hanger.

The depth data process 96 also receives outcomes from the maintenance repair organisation process 8, more particularly from the fleet planning process 82.

The depth data process 96 provides maintenance data from components or materials that have been removed from the aircraft and then analysed and/or overhauled e.g. landing gear.

Outcomes from each of the sortie data process 92, the forward data process 94, and the depth data process 96 are output from the maintenance approved organisation process 9 for inputting to the configuration control process 11 and the reliability analysis process 12.

The outcomes may include, for example, maintenance and repair data, scheduled maintenance data, operator feedback or reports.

Figure 10:
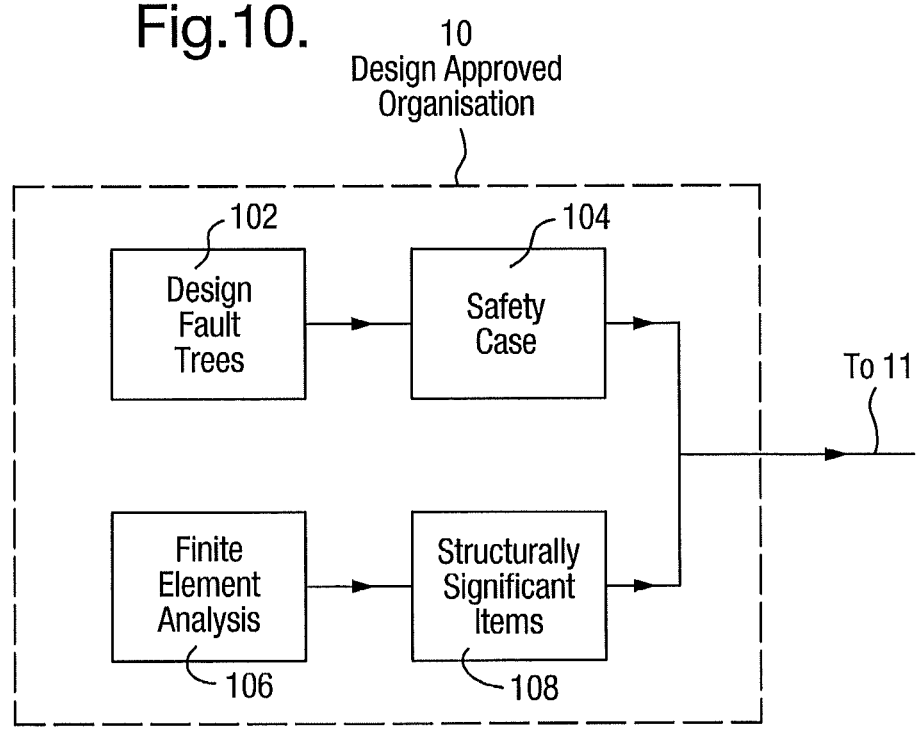
FIG. 10 is a flowchart/block diagram showing certain details of a design approved organisation process that is part of the continuous RCM process of FIG. 2.

FIG. 10 is a flowchart/block diagram showing certain details of the design approved organisation process 10. The design approved organisation process 10 comprises various processes that may conveniently be called as follows: a design fault trees process 102, a safety case process 104, a finite element analysis process 106, and a structurally significant items process 108.

The design fault trees process 102 performs bottom-up event-driven analysis. For example, the design fault trees process 102 takes an event that has occurred on the aircraft type, for example an explosion, and identifies what systems and/or items could or would have caused that event. This analysis may be performed for example using mathematical analysis. This process may also be further informed by other processes (not shown), for example "Failure Modes and Effects Criticality Analysis" (FMCA).

Outcomes from the design fault trees process 102 are input into the safety case process 104.

The safety case process 104 determines a summary or other provision of the risks and hazards identified in the fault trees, and determines or identifies mitigation approaches for them. This is in effect in relation to systems of the aircraft, as opposed to structures of the aircraft.

The finite element analysis process 106 performs testing and analysis of the structure of the aircraft. This process may also be further informed by other processes (not shown), for example "Production Major Airframe Fatigue Test" (PMAFT).

Outcomes from the finite element analysis process 106 are input into the structurally significant items process 108.

The structurally significant items process 108 (also known as SSI) determines the structurally significant items (SSI), determines or identifies risks and hazards associated with the structurally significant items, and determines or identifies mitigation approaches for them. This is in effect in relation to the structure of the aircraft, as opposed to systems of the aircraft.

Outcomes from both the safety case process 104 and the structurally significant items process 108 are output from the design approved organisation process 10 for inputting to the configuration control process 11.

The outcomes may include, for example, system safety mandated maintenance and structurally significant items that are important for the continued safe operation of the aircraft systems and structural integrity.

Figure 11:
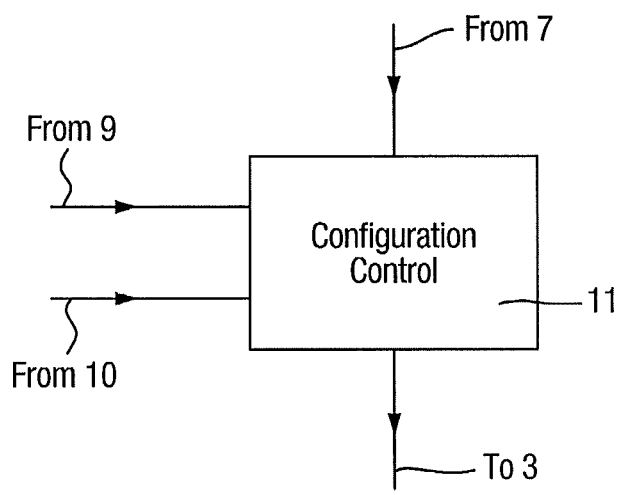
FIG. 11 is a flowchart/block diagram showing certain details of input and output flows of a configuration control process that is part of the continuous RCM process of FIG. 2.

FIG. 11 is a flowchart/block diagram showing certain details of the input and output flows of the configuration control process 11.

The configuration control process 11 receives outcomes from the identify preventive maintenance requirements process 7, the maintenance approved organisation process 9, and the design approved maintenance organisation process 10.

The configuration control process 11 performs, in effect, activities such as version control, checks that the maintenance actions and plans being implemented correspond to those that had earlier been approved, and so on. In more detail the configuration control process 11 controls the input data from the maintenance and design organisations. This process primarily attempts to ensure that the data used to conduct the RCM analysis 204 is representative of the platform design and operations. Examples of controlled input data are approved maintenance feedback reports, faults data, operational feedback and design modifications. The configuration control process 11 also controls the outputs from the RCM process 204 and preventive maintenance task analysis process 7. This provides an audit trail and control of the preventive maintenance schedules.

Outcomes of the configuration control process 11 are fed back to the trigger mechanism process 3, more particularly back to the data analysis process 34 of the trigger mechanism process 3.

Figure 12:
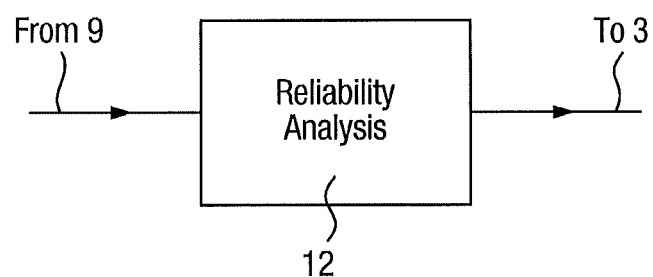
FIG. 12 is a flowchart/block diagram showing certain details of input and output flows of a reliability analysis process that is part of the continuous RCM process of FIG. 2.

FIG. 12 is a flowchart/block diagram showing certain details of the input and output flows of the reliability analysis process 12.

The reliability analysis process 12 receives outcomes from the maintenance approved organisation process 9.

The reliability analysis process 12 defines the continuous and actuarial reliability analysis of the platform in operation. This is in the form of monitoring faults data trigger levels, reliability trending and weibull/duane analysis, for example either on the platform, squadron or fleet.

Outcomes of the reliability analysis process 12 are fed back to the trigger mechanism process 3, more particularly back to the data analysis process 34 of the trigger mechanism process 3.

The continuous RCM process 20 advantageously provides a proactive maintenance strategy that primarily assures platform safety and reliability. It also provides a proactive maintenance that minimises the risk of unscheduled equipment failure and the subsequent operational/maintenance effort and costs.

The following is an example of one scenario which may make use of the processes described above with reference to FIGS. 1 to 12.

For the purposes of this example scenario the aircraft platform will be used for the baseline RCM review process 4 and RCM analysis process 204. The hydraulics system will be used for the (proactive) continuous review process 5 and the (reactive) RCM study process 6.

The RCM analysis process 204 starts in the design and development of a platform such as a particular military aircraft platform. A significant item selection process 202 will be conducted on the complete aircraft platform by system breakdown, for example the hydraulic system will have the SIS carried out on it using the SIS algorithms defined in the RCM standards such as "Procedures for Developing Preventive Maintenance—AP100C-22" and "Operator/Manufacturer Scheduled Maintenance Development—MSG-3". Each and every system on the aircraft will have the SIS process 202 carried out using design source data such as, safety case analysis, system functional descriptions, engineering drawings and interfaces.

On completion of the SIS process 202, a descriptive candidate item classification will have been applied to each item within the system. For example, within the hydraulics system candidates may be classified as either zonal process 206, functionally significant items (FSI) process 208 or structurally significant items (SSI) process 210.

The bespoke application of RCM will then be applied in accordance with the standards such as "Procedures for Developing Preventive Maintenance—AP100C-22" reports and "Operator/Manufacturer Scheduled Maintenance Development—MSG-3". The zonal analysis process 206 will be applied to zonal candidates, rating each zone dependant on susceptibility to accidental and environmental factors which may induce a multiple failure scenario.

The FSI analysis process 208 will be applied to candidates with a functional significance; this includes performing a failure modes and effects analysis and determining a theoretical criticality of loss of function. The RCM algorithm is then performed on the candidate "in-accordance-with" standards such as, "Procedures for Developing Preventive Maintenance—AP100C-22" reports and "Operator/Manufacturer Scheduled Maintenance Development—MSG-3".

The SSI analysis process 210 will be applied to candidates with a structural significance; this includes rating the structure for environmental and accidental structural rating factors and performing a failure modes and effects analysis and determining a theoretical criticality of loss of function. The RCM algorithm is then performed on the candidate in-accordance-with standards such as "Procedures for Developing Preventive Maintenance—AP100C-22" reports and "Operator/Manufacturer Scheduled Maintenance Development—MSG-3".

The completed system analysis may then quality assured using a governance process such as the governance and maintenance process 500 described later below with reference to FIG. 14, including consequential governance procedures and audit processes derived thereby. The audits are conducted in hierarchical phases. The first is performed by the RCM auditor for RCM logic and analysis process validity against the contract standards such as "Procedures for Developing Preventive Maintenance—AP100C-22" reports and "Operator/Manufacturer Scheduled Maintenance Development—MSG-3". The second phase of audit is performed by the designed approved authority for technical validity; the final phase of audit is by the operator approved authority for operational validity.

The detailed analysis and approvals of the system analysis for example the hydraulics system will be conducted in a formal maintenance working group process 214. The detailed RCM analysis supporting the preventive maintenance recommendations will be reviewed and all responses recorded before approval of the maintenance programme.

The approved hydraulics system preventive maintenance tasks from the maintenance working group process 214 will be reviewed for operational and type certification impact before approval at the maintenance review board process 216.

The approved preventive maintenance tasks undergo supportability analysis to define the preventive maintenance requirements process 7 such as, facility, spares, support equipment and detailed procedural requirements.

The detailed preventive maintenance requirements for the hydraulics system process 7 will be technically authored into maintenance publications and recorded against a released publication version in the configuration control process 11 before release into the maintenance approved organisation process 9 for use on the aircraft.

Feedback data from the hydraulics system such as component replacements, maintenance actions, and defect investigations will be recorded against the maintenance work orders at forwards operations process 94. Any items that are sent back to industry or for specialist repair will be recorded on the depth maintenance system process 96 for fault and rectification action. The operators such as pilots and aircraft preparation crew will provide any operational faults, warnings or query feedback through an operational data system process (e.g. sortie data process 92). This may also include telemetry and downloaded data from the aircraft systems. Reliability analysis process 12 is applied against a trended and cleansed form of the maintenance approved organisation data process 9. The reliability analysis provides actuarial monitoring of trends against the hydraulics system and components performing within or outside of their design performance characteristics and theoretical inherent reliability.

The approved maintenance schedule publications from 7 are used by the maintenance and repair organisation process 8 to plan fleet maintenance activities and a facility/resource requirements process (e.g. fleet planning process 82). The supply chain also use the preventive maintenance parts forecast to define a proactive supply chain demand against planned periods of maintenance activity (i.e. this is the supply chain forecasting process 84). The subsequent preventive maintenance actions, unscheduled maintenance actions process 86 and the level of parts replenishments are continually monitored against a forecast rate using arising rate management process 88.

The baseline RCM derived preventive maintenance from process 204 is continually informed from the outputs from the maintenance repair organisation process 8 for fleet planning process 82, supply chain demands process 84 and arising rate management process 88. This triggers the trigger mechanism process 3, with a subsequent review of the RCM analysis using the actual results from supply chain and maintenance planning activities. The actual reliability results from the reliability analysis process 12 and from sortie data process 92 and maintenance feedback processes (i.e. forward data process 94 and depth data process 96) provides feedback on the performance of the hydraulics system and components to the maintenance steering group process 38, whereby a prioritisation on the hydraulics components and sub-systems is defined using the maintenance repair organisation process 8, the maintenance approved organisation process 9, the design approved organisation process 10 and the reliability analysis (i.e. reliability data) process 12.

The RCM analysis process is managed continually for improvement by the maintenance and operational requirements determined in the maintenance steering group process 38. Another RCM baseline review can be applied to the entire hydraulics system using the baseline review process 4. This tends to be a costly and time consuming exercise that is generally applicable to the initial design and development review discussed earlier in this section. In conducting a baseline review a project and context scope is carried out (e.g. using the determine project scope process 41) to determine the detailed baseline review requirements, this being done in accordance with the governance process mentioned above earlier in this description of an example scenario.

The scope will define the stakeholders, business processes, resources and information systems required to conduct the baseline review on, for example, either the full aircraft suite of systems or a specific system such as the hydraulics system. A hazardous operations analysis process 42 is conducted on the project scope which identifies the risks and mitigations in conducting the baseline review. This will identify such things as stakeholder involvement and information system impact on the aircraft operation resulting in low quality hydraulics analysis. A quality management structure process 43 is then defined and implement for the baseline review with an identified organisational reporting structure against trained and competent analysts. The quality management structure process 43 and hazardous operation analysis process 42 are done in accordance with the governance process mentioned above earlier in this description of an example scenario.

The implementation of the quality management structure is planned in the implement a prioritisation process 44 and a project plan for the implementation and baseline review is developed in the develop project plan process 45. The develop project plan process 45 identifies the resource to perform the baseline review process 4 and the allocate resource process 46 allocates physical resources to the tasks within the develop project plan process 45. The allocated resources from process 46 are positioned into pre-determined roles and are used to develop the wider stakeholders in the develop stakeholders process 47 to support and approve the RCM analysis process 204. The stakeholders are typically design, technical, operational, engineering and aircraft authorities who require an input into the analysis process 204 from the design process 10, reliability analysis process 12, maintenance organisation process 9 and maintenance repair organisation process 8. The stakeholders also provide the validation within the quality assurance process 212, maintenance working group process 214 and maintenance review board process 216.

A continuous review process 5 on a proactive basis can be applied to the system dependent on a level of operational/ design change criteria. This generally would be applied if the hydraulics system was performing adequately and no single cause of maintenance impact can be determined; i.e. it could be an accumulation of components in the system, filters, flow valves and valve blocks attributing the faults within the hydraulics system. In conducting a continuous review a project and context scope is carried out on the system in question, for example the hydraulics system in process 51. This scope provides a summary of continuous review requirements; this is done in accordance with the governance process mentioned above earlier in this description of an example scenario.

The scope will define the stakeholders, business processes, resources and information systems required to conduct the continuous review on, for example, the hydraulics system. An update to the baseline review hazardous operations analysis process 42 is conducted for the hydraulics system in process 52 which identifies the risks and mitigations in conducting the continuous hydraulics system review. This will identify such things as stakeholder involvement and information system impact on the aircraft operation resulting in low quality hydraulics analysis. The quality management structure from process 43 is reviewed in process 53 against the requirements for the continuous review project scope process 51. The quality management structure process 53 and hazardous operation analysis process 52 are done in accordance with the governance process mentioned above earlier in this description of an example scenario.

The implementation of the quality management structure is planned in the implement a prioritisation process 54 and a project plan for the implementation and the continuous review is developed in the develop project plan process 55. The develop project plan process 55 identifies the resource to perform the hydraulics system review process 5 and the allocate resource process 56 allocates physical resources to the tasks within the develop project plan process 55. The allocated resources from process 56 are positioned into pre-determined roles and are used to develop the wider stakeholders in the develop stakeholders process 57 to support and approve the RCM analysis process 204. The stakeholders are typically design, technical, operational, engineering and aircraft authorities who require an input into the analysis process 204 from the design process 10, reliability analysis process 12, maintenance organisation process 9 and maintenance repair organisation process 8. The stakeholders also provide the validation within the quality assurance process 212, maintenance working group process 214 and maintenance review board process 216. The RCM analysis process 204 is then re-run in accordance with the project scope process 51, hazardous operations analysis process 52, quality management structure process 53, and develop project plan process 55.

An RCM study 6 can be performed on a reactive basis on selected components within the hydraulics system that are being identified using the maintenance repair organisation process 8, the maintenance approved organisation process 9, the design approved organisation process 10 and the reliability analysis (reliability data) process 12. An RCM study can also be initiated if the system has been identified as being subject to operational environmental changes. For example, if the hydraulics system performed differently due to operations in hostile operational or environmental circumstances. In conducting a continuous review a project and context scope is carried out on the system in question, for example the hydraulics system in the determine project scope process 61. This scope provides a summary of RCM review requirements; this is done in accordance with the governance process mentioned above earlier in this description of an example scenario.

The scope will define the stakeholders, business processes, resources and information systems required to conduct the RCM review on, for example, the hydraulic valve block. An update to the baseline review hazardous operations analysis process 42 is conducted for the hydraulic valve block in process 62 which identifies the risks and mitigations in conducting the hydraulic valve block review. This will identify such things as stakeholder involvement and information system impact on the aircraft operation resulting in low quality hydraulics analysis. The quality management structure from process 43 is reviewed in process 63 against the requirements for the continuous review project scope process 61. The quality management structure process 63 and hazardous operation analysis 62 are done in accordance with the governance process mentioned above earlier in this description of an example scenario.

The implementation of the quality management structure is planned in the implement a prioritisation process 64 and a project plan for the implementation and the RCM review is developed in the develop project plan process 65. The develop project plan process 65 identifies the resource to perform the hydraulic valve block review process 6 and process 66 allocates physical resources to the tasks within the project plan process 65. The allocated resources from process 66 are positioned into pre-determined roles and are used to develop the wider stakeholders in process 67 to support and approve the RCM analysis process 204. The stakeholders are typically design, technical, operational, engineering and aircraft authorities who require an input into the analysis process 204 from the design process 10, reliability analysis process 12, maintenance organisation process 9 and maintenance repair organisation process 8. The stakeholders also provide the validation within the quality assurance process 212, maintenance working group process 214 and maintenance review board process 216.

If the project scope requirements in process 61 determine a full operational context review of the hydraulics system or a number of affected systems, then a life cycle management framework is implemented in the determine life cycle management process 68. This would apply to, for example, a study into the operation of the hydraulics system of the particular type of military aircraft within a given environmentally hostile operational area. The determine life cycle management process 68 identifies a number of project management gates in which the RCM review may be audited against for progress, expended technical resource, and cost in performing the analysis. This is managed by a dedicated project manager and reported back to both the commercial, aircraft and design authorities. As a result a bespoke and tailored preventive maintenance report is developed in the bespoke application (of RCM) process 69 that identifies the bespoke preventive maintenance requirements on, for example, the hydraulics system whilst the aircraft is operating within the given environmentally hostile operational area. This bespoke application (of RCM) process 69 is then used to conduct the RCM analysis process 204.

Figure 13:
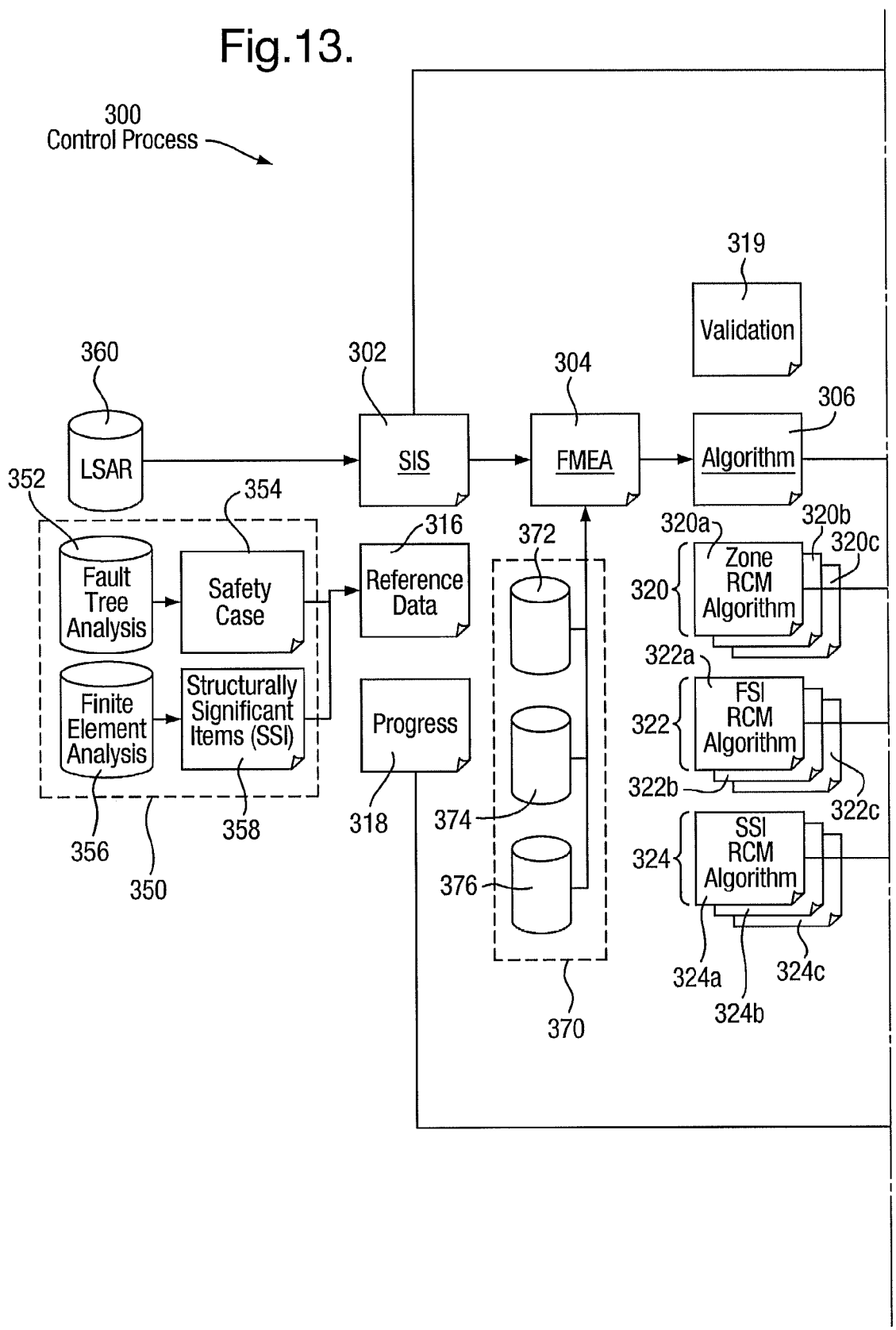
FIG. 13 is a block diagram of a control process/data flow for controlling aspects of the continuous RCM process of FIG. 2.

FIG. 13 is a block diagram of a control process 300 for controlling aspects of the above described embodiments, and any other embodiments described later below, of the continuous RCM process 20. The control process may conveniently be implemented in the form of software for providing control outputs. This software, or other forms of implementation of the control process 300, may be considered as a form of toolset in the sense that this term is used sometimes in the field of RCM.

Accordingly, the following description of the control process 300 may allow even more detailed understanding of the above described embodiments of the continuous RCM process 20, or at least certain parts of, or examples of, those embodiments of the continuous RCM process 20. Indeed, one or more advantageous aspects of the control process 300 provide additional elements to yet further embodiments extending thereby from the above described embodiments of the continuous RCM process 20. However, in the opposite sense, it is also noted that the following example(s) of the control process 300 include further control details that in themselves may tend to be advantageous and that are not essential for the implementation of many embodiments of the continuous RCM process 20.

The control process 300 comprises the following elements that are in essence performed in the following sequence: a significant item selection (SIS) element 302, a failure modes and effects analysis (FMEA) element 304, an algorithm element 306, a tasks element 308, a sampling element 310, a reports element 312 and an audit element 314. FIG. 13 also represents in effect a data flow route i.e. from the significant item selection (SIS) element 302 to the failure modes and effects analysis (FMEA) element 304 to the algorithm element 306 to the tasks element 308 to the sampling element 310 to the reports element 312 and finally to the audit element 314. In other examples of the control process 300, one or more of these elements may be omitted.

The format of FIG. 13 is such that the following elements laid out in FIG. 13 in columns related to certain of the elements described above in the preceding paragraph represent in effect possibilities of what may be produced by the respective element described above in the preceding paragraph, as follows.

In the case of the SIS element 302: reference data 316, and progress data 318. These elements provide the archive of the original reference/source data that has been/will be used for the RCM analysis process 204. The reference data 316 is provided via the configuration control process 11. The SIS element is the down selection of preventive maintenance candidates for RCM analysis using the reference data element 316. The progress data 318 is the project management timescales requirement for the RCM analysis process 204; this provides continual monitoring of RCM analysis against an agreed project schedule.

In the case of the algorithm element 306: validation data 319, zone RCM algorithm data 320, FSI RCM algorithm data 322, and SSI RCM algorithm data 324. The algorithmic development of the FSI, SSI and zonal RCM analysis is undertaken in accordance with the contractual RCM standards. Examples of these standards and algorithms are contained in "Operator/Manufacturer Scheduled Maintenance Development—MSG-3" and "Procedures for Developing Preventive Maintenance—AP100C-22".

In the case of the reports element 312: PM1 data 326, PM2a data 328, PM2b data 330, PM4 data 332, PM5 data 334, benchmarking data 335, EZAP data 336, progress reports data 338, and users data 340. These reports are similar in content: the PM1 data 326 comprises item details; the PM2a data 328 comprises a lifed items list; the PM2b data 330 comprises failure modes and effects criticality analysis and RCM algorithms, the PM4 data 332 comprises zonal analysis data; the PM5 data 334 comprises sampling analysis data; the EZAP data 336 comprises enhanced zonal analysis data. The PM reports, e.g. the progress reports 338 are standard "Procedures for Developing Preventive Maintenance—AP100C-22" reports. The EZAP data 336 is an addition from "Operator/Manufacturer Scheduled Maintenance Development—MSG-3". A new type of report is provided using benchmarking data 335, as well as for example comparative maintenance programme analysis at a pre and post RCM review stage at platform, system, sub-system or component level. The progress reports data 338 defines the project schedule adherence and RCM analysis progress against the process 204. User data (reports data) 340 comprises user defined outputs that can be tailored by the user on an ad hoc basis.

In the case of the audit element 314: in-work data 342, forum data 344, and archive data 346. These types of data provide workflow management of the RCM process 204. The audit element 314 provides records of completed and approved RCM analysis reports. In-work data element 342 allows editable RCM analysis in draft form to be released for comments; these comments are recorded in a discussion forum element 344. Once a maintenance working group process 214 has been completed on the basis of the comments from the forum element 344 the RCM analysis reports can be finalised and approved as read only records in the archive element 346.

In this example, the SIS element 302 corresponds to the significant item selection process 202 of the conventional RCM process 1 part of the earlier described continuous RCM process 20.

In this example, the SIS element 302 provides reference data 316. Provision of this reference data 316 by the SIS element 302 makes use of input from design approved organisation functionality 350. The design approved organisation functionality 350 comprises fault tree analysis functionality 352, safety case functionality 354, finite element analysis functionality 356, and structurally significant items (SSI) functionality 358. The fault tree analysis functionality 352 is arranged to feed data in to the safety case functionality 354. The finite element analysis functionality 356 is arranged to feed data in to the structurally significant items (SSI) functionality 358. The safety case functionality 354 and the structurally significant items functionality 358 are arranged to feed data in to the SIS element 302. The design approved organisation functionality 350, and its constituent functionalities, correspond to, and operate with the same effect as, the corresponding processes of the design approved organisation process 10 that forms part of the example of a continuous RCM process 20 described earlier above.

In this example, the SIS element 302 also provides progress data 318. This progress data 318 is data for managing and tracking project performance, e.g. start and finish dates.

In this example, the SIS element 302 receives input from LSAR functionality 360. The LSAR 360 provides a logistical support analysis record (i.e. source/input data). The LSAR 360 has maintenance and support requirements i.e. may be viewed as a configuration master-source. The output of the LSAR 360 provides a direct interface into the list of candidates for the SIS element 302 at the start of the RCM analysis process 204.

In this example, the FMEA element 304 provides failure modes and effects analysis. The FMEA element 302 makes use of input from maintenance approved organisation functionality 370. The maintenance approved organisation functionality 370 comprises sortie data functionality 372, forward maintenance functionality 374, and depth maintenance functionality 376. The maintenance approved organisation functionality 370, and its constituent functionalities, correspond to, and operate with the same effect as, the corresponding processes of the maintenance approved organisation process 9 that forms part of the example of a continuous RCM process 20 described earlier above.

In this example, the algorithm element 306 provides appropriate algorithm types for later use. The algorithm types include zone RCM algorithms 320, FSI RCM algorithms 322 and SSI RCM algorithms 324. In each case, a plurality of different versions of each type of algorithm are provided, e.g. one for each type of aircraft that the control process 300 and/or the continuous RCM process 20 is to be used for. Shown by way of example in FIG. 13 are three different versions 320a, 320b, and 320c of zone RCM algorithms, three different versions 322a, 322b, and 322c of FSI RCM algorithms, and three different versions 324a, 324b, and 324c of SSI RCM algorithms. This is the application of the algorithms within the contractual RCM standards, such as "Procedures for Developing Preventive Maintenance—AP100C-22" reports, and "Operator/Manufacturer Scheduled Maintenance Development—MSG-3".

In this example, the algorithm element 306 also provides validation data 319. The background to this validation data is that operators or systems may inadvertently extend outside of the appropriate rules being used in, for example, the continuous RCM process 20. The validation data 319 is used for automatic data validation. An output may be provided to a graphical user interface (GUI) for showing conformity or contravention of the rules.

In this example, the tasks element 308 provides an analogous role to a conventional RCM process of defining what is going to be done, for example defining preventive maintenance tasks. This may include identifying whether a given preventive maintenance task is driven by safety case considerations/outputs or by structurally significant items (SSI) considerations/outputs.

In this example, the sampling element 310 provides functionality to perform RCM derived sampling. Sampling is used to validate preventive maintenance tasks by requesting instruction for feedback on the effectiveness and findings from conducting the preventive maintenance task.

In this example, the reports element 312 provides data that corresponds to various reports and the like, as follows. The PM1 data 326—item details. The PM2a data 328—lifed items list. The PM2b data 330—failure modes and effects criticality analysis and RCM algorithms. The PM4 data 332—zonal analysis. The PM5 data 334—sampling analysis. The EZAP data 336—enhanced zonal analysis. The PM reports are in the contractual RCM standards such as "Procedures for Developing Preventive Maintenance—AP100C-22" reports. The EZAP is an addition from "Operator/Manufacturer Scheduled Maintenance Development—MSG-3". Additional reports have been developed to provide benchmarking data 335 comparative maintenance programme analysis at a pre and post RCM review stage at platform, system, sub-system or component level. Progress reports data 338 defines the project schedule adherence and RCM analysis progress against the RCM analysis process 204. User data (reports data) 340 comprises user defined outputs that can be tailored by the user on an ad hoc basis.

In this example, the reports element 312 provides, as mentioned above, PM1 data 326, PM2a data 328, PM2b data 330, PM4 data 332, PM5 data 334, benchmarking data 335, EZAP data 336, progress reports data 338, and users data 340.

Provision of the PM1 data 326 by the reports element 312 makes use of input from the SIS element 302. The PM reference of the report is derived from "Procedures for Developing Preventive Maintenance—AP100C-22". The PM1 in its generic form is the item details report containing the descriptive nomenclature data, assembly and reliability of the item under analysis.

Provision of the PM2a data 328 by the reports element 312 makes use of input from the algorithm element 306, more particularly from one or more of the algorithms 320, 322, 324. The PM reference of the report is derived from "Procedures for Developing Preventive Maintenance—AP100C-22". The PM2a in its generic form is the component life data that relates to the item overhaul, replacement and restoration details.

Provision of the PM2b data 330 by the reports element 312 makes use of input from the algorithm element 306, more particularly from one or more of the algorithms 320, 322, 324. The PM reference of the report is derived from "Procedures for Developing Preventive Maintenance—AP100C-22". The PM2b in its generic form is the Failure modes and effects analysis and RCM algorithm results.

Provision of the PM4 data 332 by the reports element 312 makes use of input from the algorithm element 306, more particularly from one or more of the algorithms 320, 322, 324. The PM reference of the report is derived from "Procedures for Developing Preventive Maintenance—AP100C-22". The PM4 in its generic form is the zonal analysis report defining the ratings of accidental and environmental zonal rating factors.

Provision of the PM5 data 334 by the reports element 312 makes use of input from the sampling element 310. The PM reference of the report is derived from "Procedures for Developing Preventive Maintenance—AP100C-22". The PM5 in its generic form is the definition of a sampling requirement such as information requirements, task detail requirements and a range of the sample population at either the (for example) item, platform, squadron or fleet.

Each type of the PM data, i.e. the PM reports, namely the PM1 data 326, the PM2a data 328, the PM2b data 330, the PM4 data 332, and the PM5 data 334, is a respective conventional PM report as defined/used in conventional RCM, for example in conventional RCM performed according to "Operator/Manufacturer Scheduled Maintenance Development—MSG-3".

Provision of the benchmarking data 335 by the reports element 312 makes use of input from the tasks element 308.

The benchmarking data 335 is used, for example, to benchmark current versions or implementations of the maintenance programs compared to previous versions, to determine what has changed as the continuous RCM process, for example, has been modified over time.

Provision of the EZAP data 336 by the reports element 312 (where "EZAP" is Enhanced Zonal Analysis Procedure) makes use of input from the algorithm element 306, more particularly from one or more of the algorithms 320, 322, 324.

The EZAP data 336 is used, for example, to assess or indicate zonal safety hazards. The PM reference of the report is derived from "Operator/Manufacturer Scheduled Maintenance Development—MSG-3". The EZAP in its generic form is the zonal analysis of safety related hazards due to multiple failure, such as combustible materials, deterioration in wiring, ignition sources, lightning protection or exposure to high intensity radio frequency.

Provision of the progress reports data 338 by the reports element 312 makes use of input from the SIS element 302, more particularly the progress data 318 described earlier above, i.e. data for managing and tracking project performance, e.g. start and finish dates.

Accordingly the progress reports data 338 is used, for example, to manage and track project performance, e.g. start and finish dates.

The users data 340 provides a report facility to provide reports to users of, for example, the continuous RCM process 20. More particularly, in this example, this functionality provides a user defined report facility on an ad hoc basis.

In this example, the audit element 314 provides data archiving and work flow control/management. For example, the audit element 314 provides in-work data 342, forum data 344, and archive data 346. The in-work data 342 is provided for assessment/discussion/approval by stakeholders. The forum data 344 provides a form of distribution list. The in-work data 342 may be fed in to the forum data 344. The archive data 346 provides a store of data that is stored in a non-changeable form, e.g. as often known as "read-only". The forum data may be fed in to the archive data 346. Read-out or other output of/from the archive data 346, may, for example and as shown in FIG. 13, comprise in effect outputting or feeding the archive data 346 to additional LSAR functionality 382 and to configuration data functionality 384.

The configuration data functionality 384 is in effect providing export or outputting of configuration data corresponding to configuration data provided by/described with reference to the configuration control process 11 that forms part of the example of a continuous RCM process 20 described earlier above (in particular the aspects of a baseline RCM review and a controlled continuous improvement or RCM process).

The additional LSAR functionality 382 is an interface between, on the one side, the RCM analysis process 204 and toolset outputs element (i.e. archive data element 346), and, on the other side a maintenance and supportability analysis information system based upon the requirements of standards such as Application of Integrated Logistics Support DEF STAN 00-60 and 00-600.

Data provided by from the additional LSAR functionality 382 is output to technical authoring functionality 386 and to fleet planning functionality 388. This may, advantageously, be implemented automatically in response to a simple input instruction, such as a click, by a human operator via a GUI.

The technical authoring functionality 386 corresponds to, and operates with the same effect as, the corresponding technical authoring process 74 of the identify preventive maintenance requirements process 7 that forms part of the example of a continuous RCM process 20 described earlier above.

Data provided by the fleet planning functionality 388 is output to forward maintenance functionality 390 and to depth maintenance functionality 392. The fleet planning functionality 388, forward maintenance functionality 390, and depth maintenance functionality 392 correspond to, and operate individually and in combination with the same effects as, the following respective corresponding processes that form parts of the example of a continuous RCM process 20 described earlier above: the fleet planning process 82, the forward data process 94, and the depth data process 96.

The control process 300 tends to provide the following advantages: autonomous control of the RCM business process 204; and autonomous assurance and validation against RCM standards (such as "Procedures for Developing Preventive Maintenance—AP100C-22" reports and "Operator/Manufacturer Scheduled Maintenance Development—MSG-3"). Furthermore, the control process 300 provides workflow management and interrogation of input and output data sources from a configuration controlled and approved maintenance programme. The control process 300 provides governance, assurance and a performance enhancing method that allows simplified and effective forms of these, despite the extremely complex nature of the RCM analysis process 204 and the overall continuous RCM process 20.

FIG. 14 is a process flowchart showing certain steps of an example of an RCM governance and maintenance actions process 500 that may optionally be applied, for example, to the above described embodiments of the continuous RCM process 20.

At step 502, a military aircraft governance framework is provided, for example by formalising an approach based on guidance given within "Using Reliability Centred Maintenance to Manage Engineering Failures" DEF STAN 0-45, "Maintenance Approved Organisation Scheme" DEF STAN 05-130 and "Operator/Manufacturer Scheduled Maintenance Development—MSG-3".

At step 504, a civil aircraft governance framework 504 is provided, for example, a governance regime as specified and regulated by the UK Civil Aviation Authority (CAA) "Airworthiness Procedures where the CAA has Primary Responsibility for Type Approval of the Produce"—CAP553 and/or the Federal Aviation Administration in the USA (FAA) order "Aircraft Certification Governance" 1370.76B.

It is noted that steps 502 and 504 are shown in FIG. 14 as taking place in parallel. They may however alternatively be performed sequentially, or in some form of partial temporal overlap.

At step 506, some or all of the civil aircraft governance framework is compared to some or all of the military aircraft governance framework.

At step 508, one or more components of the civil aircraft governance framework is added to, i.e. incorporated in, the military aircraft governance framework to provide a modified military aircraft governance framework.

At step 510, RCM is performed on a military aircraft, including the resulting performance of maintenance actions, such as replacing or testing a component of the aircraft, under the control and supervision of the modified military aircraft governance framework. In this example, the RCM that is performed, and the resulting maintenance actions, are the continuous RCM process 20 as described earlier above. However, in other examples, they may be any other appropriate military aircraft RCM process, including for example a stand-alone version of the conventional RCM process 1 described earlier above.

In this example, the governance framework comprises the military and civil guidance for conducting RCM "Using Reliability Centred Maintenance to Manage Engineering Failures" DEF STAN 0-45, "Maintenance Approved Organisation Scheme" DEF STAN 05-130 and "Operator/Manufacturer Scheduled Maintenance Development—MSG-3"; and in particular:

Organisation process framework (within the Integrated Solutions Business Model).

Project specific Quality Management System frameworks or Policy and Procedures Handbooks (PPH).

RCM Training course framework for practitioners, SMEs and stakeholders.

RCM Maintenance Working Groups (MWG) for approval of RCM analysis.

In further examples, plural civil aircraft governance frameworks may be made use of in parallel as part of steps 504, 506, and 508, rather than just one civil aircraft governance framework.

In yet further examples, plural military aircraft governance frameworks may be modified or combined as part of steps 502, 506, and 508, in addition to incorporating one or more components from one or more civil aircraft governance frameworks.

In yet further examples, any of the above examples may further include steps of providing one or more governance frameworks from other areas of industry (other than military or civil aircraft), and as part of step 506 additionally comparing that or those to the provided military aircraft governance framework, and accordingly at step 508 additionally incorporating one or more components of the governance frameworks from other areas of industry to provide the modified military aircraft governance framework that is then used in step 510. Examples of the other areas of industry are oil, gas, and nuclear power.

Thus, in overview, the present inventor has extracted techniques from civil aerospace governance approaches and other industrial governance approaches and applied them to military aerospace governance of RCM.

For example, some examples of techniques that have been extracted are as follows:

Trained RCM analysts.

Trained RCM Assurance Leaders.

Trained Stakeholders.

Central governance and certification function.

Central Maintenance Programme Review function.

Approved and validated RCM methodologies.

End to End Project scope and implementation framework.

Hazardous operational analysis and risk mitigation.

Detailed Military Aircraft Structural RCM analysis method.

Detailed Civilian Aircraft Enhanced Zonal Analysis Procedures.

Any one or more of the above may be extracted in different respective examples.

Accordingly, various techniques are made use of that have, over the course of time, been improved more in the field of civil aircraft RCM governance, or made more uniform (and when also incorporated, RCM governance in other areas of industry) compared to corresponding lesser improvements in the field of military aircraft RCM governance. Thus, in the above examples, the benefits of these more-developed techniques are advantageously made use of in the field of military aircraft RCM governance. This is the result, at least in part, of the present inventor breaking through a long-held technical prejudice in the field of military aircraft RCM governance that the fundamental differences between military aircraft RCM governance and civil aircraft RCM governance (and also RCM governance of other areas of industry) set them sufficiently far apart in their characteristics that components of one are not applicable to the other. Thus, in essence, the present inventor has made the surprising realisation, against the above mentioned long-held technical prejudice, that even though there is a significant size of the fundamental differences between military aircraft RCM governance and civil aircraft RCM governance (and also RCM governance of other areas of industry), nevertheless because improvements made in the field of civil aircraft RCM governance (and also RCM governance of other areas of industry) have tended to be significantly greater over time than those made in the field of military aircraft RCM governance, then it is now of benefit to incorporate current civil aircraft (and other industry areas) improvements in military aircraft RCM governance as the size of the improvements of these now outweigh the significant size of the fundamental differences between military aircraft RCM governance and civil aircraft RCM governance (and also RCM governance of other areas of industry).

The above described RCM governance comprises activities such as maintaining the RCM process within defined bounds, and is achieved at least in part by performing processes such as those described above as forming part of the baseline review process 4, for example set-up type processes. This may include processes such as the develop stakeholders process 47 described earlier above. For example, for a given platform, for example type of aircraft, a respective team leader and respective quality assurance controllers may be provided at the top of a hierarchical operator arrangement. Such a team leader may, for example, control or manage the setting-up processes of the baseline review process 4, and the more ongoing processes of the continuous review process 5, the RCM study process 6, and the conventional RCP process 1 when part of the continuous RCM process 20. Such a quality assurance controller may, for example, control or manage quality assuring processes that process outputs from the conventional RCM process 1 when part of the continuous RCM process 20. Below the team leader and quality assurance controller may be a hierarchy of operators for monitoring and processing the RCM processes and for assuring the processes and outcomes. Respective team leaders from respective platforms take place in common control/management processes whereby individual insight is taken advantage of collectively, in a structured and programmed manner in which large amount of detail are processed in a structured and programmed manner. It will be appreciated by the person skilled in the art RCM governance that both RCM and RCM governance are highly complex processes, and the full detailed specification of any specific RCM program/governance program would in practice usually require many thousands of pages or data sets. Accordingly the description here is by necessity in a simplified form. The person skilled in the art of RCM governance will be aware of this and will accordingly be able to implement highly complex systems/processes/programs based on these simplified descriptions, as this by necessity is a skill routinely employed in this field.

Apparatus, for implementing part or all of each of the above arrangements including respective functional modules/elements, and performing the respective method steps/process steps/elements/data flows etc., may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It will be appreciated that the above described embodiments are merely particular implementation examples that are possible from a large number of examples of very complex arrangements. Accordingly, in further embodiments any one or more process step/functional module/data flow/data element etc. may be omitted, or its respective position or interaction rearranged, unless stated otherwise above. This is the case for both the hierarchical level shown in FIG. 2 for components of the continuous RCM process 20 (i.e. for the inclusion of, and/or relative relationship between, processes such as the trigger mechanism process 3, the baseline review 4, and so on) and for the hierarchical level shown in FIG. 1 and FIGS. 3-12 (i.e. for the inclusion of, and/or relative relationship between, the component processes that go together to form a respective process from amongst the processes such as the trigger mechanism process 3, the baseline review 4, and so on) and the different component parts shown in FIGS. 13 and 14.

Furthermore, in relation to any of the above described embodiments, in yet further embodiments one or more additional process steps/functional modules/data flows/data elements etc. may be included in addition to the ones described above, i.e. may be inserted between the ones described above, and will accordingly therefore change certain details of where data flows in terms of from one process step/functional module/data flow/data element etc. to another.

The above described embodiments relate to RCM specifically for military aircraft, but this need not be the case, and in other embodiments the continuous RCM process may be applied to or adapted for other types of aircraft or vehicles, or indeed other complex or safety critical systems.

What is claimed is:

1. A maintenance method based on reliability centred maintenance (RCM), the maintenance method comprising:
    performing RCM, producing RCM outcomes;
    feeding the RCM outcomes to an identify preventive maintenance requirements process, producing identify preventive maintenance requirements process outcomes;
    feeding the identify preventive maintenance requirements process outcomes to a maintenance repair organisation process, producing maintenance repair organisation process outcomes;
    feeding the maintenance repair organisation process outcomes to a maintenance approved organisation process and an update process,
    the update process comprising
        a trigger mechanism process;
        a baseline review process;
        a continuous review process;
        an RCM study process,
        wherein the trigger mechanism process receives input from the maintenance repair organisation process and provides input to the baseline review process, the continuous review process, and the RCM study process;
    performing the update process to provide update data for performing the RCM; and
    inputting the update data into the performing of the RCM.

2. A method according to claim 1, comprising:
    carrying out a maintenance action selected by the performing of the RCM; and
    wherein the outcomes derived from performing the RCM that are fed to the update process comprise outcomes from the maintenance action that is carried out.

3. A method according to claim 2, wherein the carried out maintenance action is performed as part of the maintenance repair organisation process.

4. A method according to claim 1, comprising:
    carrying out a maintenance action performed at a time specified by the performing of the RCM, and wherein the outcomes derived from performing the RCM that are fed to the update process comprise outcomes from the maintenance action that is carried out.

5. A method according to claim 1, comprising:
    carrying out a maintenance action performed to an extent specified by the performing of the RCM, wherein the outcomes derived from performing the RCM that are fed to the update process comprise outcomes from the maintenance action that is carried out.

6. A method according to claim 1, comprising:
    a continuously updating RCM process.

7. A method according to claim 1, wherein the maintenance method is applied to a military aircraft.

8. Apparatus for performing a maintenance method based on reliability centred maintenance (RCM), the apparatus comprising:
    one or more processors configured to perform the following function in a feedback manner:
    i) performing RCM, producing RCM outcomes;
    ii) feeding outcomes derived from performing the RCM to an identify preventive maintenance requirements process, producing identify preventive maintenance requirements process outcomes;

iii) feeding the identify preventive maintenance requirements process outcomes to a maintenance repair organisation process, producing maintenance repair organisation process outcomes; iv) feeding the maintenance repair organisation process outcomes to a maintenance approved organisation process and an update process, the update process comprising a trigger mechanism process;

a baseline review process;

a continuous review process;

an RCM study process, wherein the trigger mechanism process receives input from the maintenance repair organisation process and provides input to the baseline review process, the continuous review process, and the RCM study process; v) performing the update process to provide update data for performing the RCM; and vi) inputting the update data into the performing of the RCM.

9. A program stored on a non-transitory computer-readable medium or plurality of programs stored on a non-transitory computer-readable medium that will, when executed by a computer system or one or more processors, cause the computer system or the one or more processors to perform the method of claim 1.

* * * * *